United States Patent
Paithane et al.

(10) Patent No.: US 10,671,726 B1
(45) Date of Patent: Jun. 2, 2020

(54) SYSTEM AND METHOD FOR MALWARE ANALYSIS USING THREAD-LEVEL EVENT MONITORING

(71) Applicant: FireEye, Inc., Milpitas, CA (US)

(72) Inventors: Sushant Paithane, Sunnyvale, CA (US); Michael Vincent, Sunnyvale, CA (US); Sai Vashisht, Union City, CA (US)

(73) Assignee: FireEye Inc., Milpitas, CA (US)

( * ) Notice: Subject to any disclaimer, the term of this patent is extended or adjusted under 35 U.S.C. 154(b) by 0 days.

(21) Appl. No.: 14/493,201

(22) Filed: Sep. 22, 2014

(51) Int. Cl.
G06F 21/00 (2013.01)
G06F 21/56 (2013.01)
H04L 29/06 (2006.01)

(52) U.S. Cl.
CPC ........ G06F 21/562 (2013.01); H04L 63/1416 (2013.01)

(58) Field of Classification Search
CPC ...... G06F 21/56; G06F 21/566; G06F 21/552; G06F 21/53; H04L 63/145
USPC .......................................................... 726/24
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Bhattarakosol, Pattarasinee, and Vasin Suttichaya. "Multiple Equivalent Scale Scan: An Enhancing Technique for Malware Detection." Systems and Networks Communications, 2007. ICSNC 2007. Second International Conference on. IEEE, 2007.*

(Continued)

*Primary Examiner* — Syed A Zaidi
(74) *Attorney, Agent, or Firm* — Rutan Tucker, LLP

(57) ABSTRACT

According to one embodiment, a computerized method comprises processing one or more objects by a first thread of execution that are part of a multi-thread process, monitoring events that occur during the processing of the one or more objects by the first thread, and storing information associated with the monitored events within an event log. The stored information comprises at least an identifier of the first thread to maintain an association between the monitored events and the first thread. Subsequently, the stored information within the event log is accessed for rendering a graphical display of the monitored events detected during processing of the one or more objects by the first thread on a display screen.

50 Claims, 11 Drawing Sheets

(56) References Cited

U.S. PATENT DOCUMENTS

| | | | |
|---|---|---|---|
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,620,992 B2 * | 11/2009 | Monastyrsky ........ G06F 21/566 726/22 |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,484,727 B2 * | 7/2013 | Zaitsev ................. G06F 21/552 726/22 |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |

(56) References Cited

U.S. PATENT DOCUMENTS

| | | |
|---|---|---|
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,058,504 B1* | 6/2015 | Swanson .............. G06F 21/52 |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0092012 A1* | 7/2002 | Shah .............. G06F 9/5033 717/170 |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0050821 A1* | 3/2003 | Brandt .............. G06Q 10/06 705/2 |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0185423 A1* | 9/2004 | Pearson .............. G06Q 30/02 434/322 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0128406 A1* | 6/2006 | Macartney .......... H04L 63/1416 455/466 |

(56) References Cited

U.S. PATENT DOCUMENTS

| | | |
|---|---|---|
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1* | 4/2009 | Wang .................... G06F 21/53 726/24 |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0199297 A1* | 8/2009 | Jarrett .................... G06F 21/566 726/24 |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0150006 A1 | 6/2010 | Pourzandi et al. |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1* | 4/2011 | Aziz .................... G06F 21/552 726/24 |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |

(56) References Cited

U.S. PATENT DOCUMENTS

| | | | |
|---|---|---|---|
| 2011/0145934 | A1 | 6/2011 | Abramovici et al. |
| 2011/0167493 | A1 | 7/2011 | Song et al. |
| 2011/0167494 | A1 | 7/2011 | Bowen et al. |
| 2011/0173460 | A1 | 7/2011 | Ito et al. |
| 2011/0219449 | A1 | 9/2011 | St Neitzel et al. |
| 2011/0219450 | A1 | 9/2011 | McDougal et al. |
| 2011/0225624 | A1 | 9/2011 | Sawhney et al. |
| 2011/0225655 | A1 | 9/2011 | Niemela et al. |
| 2011/0247072 | A1 | 10/2011 | Staniford et al. |
| 2011/0265182 | A1 | 10/2011 | Peinado et al. |
| 2011/0277033 | A1* | 11/2011 | Ramchetty ............ G06F 21/566 726/24 |
| 2011/0289582 | A1 | 11/2011 | Kejriwal et al. |
| 2011/0302587 | A1 | 12/2011 | Nishikawa et al. |
| 2011/0307954 | A1 | 12/2011 | Melnik et al. |
| 2011/0307955 | A1 | 12/2011 | Kaplan et al. |
| 2011/0307956 | A1 | 12/2011 | Yermakov et al. |
| 2011/0314546 | A1 | 12/2011 | Aziz et al. |
| 2012/0023593 | A1 | 1/2012 | Puder et al. |
| 2012/0054869 | A1 | 3/2012 | Yen et al. |
| 2012/0066698 | A1 | 3/2012 | Yanoo |
| 2012/0079596 | A1 | 3/2012 | Thomas et al. |
| 2012/0084859 | A1 | 4/2012 | Radinsky et al. |
| 2012/0096553 | A1 | 4/2012 | Srivastava et al. |
| 2012/0110667 | A1 | 5/2012 | Zubrilin et al. |
| 2012/0117652 | A1 | 5/2012 | Manni et al. |
| 2012/0121154 | A1 | 5/2012 | Xue et al. |
| 2012/0124426 | A1 | 5/2012 | Maybee et al. |
| 2012/0174186 | A1 | 7/2012 | Aziz et al. |
| 2012/0174196 | A1 | 7/2012 | Bhogavilli et al. |
| 2012/0174218 | A1 | 7/2012 | McCoy et al. |
| 2012/0198279 | A1 | 8/2012 | Schroeder |
| 2012/0210423 | A1 | 8/2012 | Friedrichs et al. |
| 2012/0222121 | A1 | 8/2012 | Staniford et al. |
| 2012/0255015 | A1 | 10/2012 | Sahita et al. |
| 2012/0255017 | A1 | 10/2012 | Sallam |
| 2012/0260342 | A1 | 10/2012 | Dube et al. |
| 2012/0266244 | A1 | 10/2012 | Green et al. |
| 2012/0278886 | A1 | 11/2012 | Luna |
| 2012/0297489 | A1 | 11/2012 | Dequevy |
| 2012/0330801 | A1 | 12/2012 | McDougal et al. |
| 2013/0014259 | A1 | 1/2013 | Gribble et al. |
| 2013/0036472 | A1 | 2/2013 | Aziz |
| 2013/0047257 | A1 | 2/2013 | Aziz |
| 2013/0074185 | A1 | 3/2013 | McDougal et al. |
| 2013/0086684 | A1 | 4/2013 | Mohler |
| 2013/0097699 | A1 | 4/2013 | Balupari et al. |
| 2013/0097706 | A1 | 4/2013 | Titonis et al. |
| 2013/0111587 | A1 | 5/2013 | Goel et al. |
| 2013/0117852 | A1 | 5/2013 | Stute |
| 2013/0117855 | A1 | 5/2013 | Kim et al. |
| 2013/0139264 | A1 | 5/2013 | Brinkley et al. |
| 2013/0160125 | A1 | 6/2013 | Likhachev et al. |
| 2013/0160127 | A1 | 6/2013 | Jeong et al. |
| 2013/0160130 | A1 | 6/2013 | Mendelev et al. |
| 2013/0160131 | A1 | 6/2013 | Madou et al. |
| 2013/0167236 | A1 | 6/2013 | Sick |
| 2013/0174214 | A1 | 7/2013 | Duncan |
| 2013/0185789 | A1 | 7/2013 | Hagiwara et al. |
| 2013/0185795 | A1 | 7/2013 | Winn et al. |
| 2013/0185798 | A1 | 7/2013 | Saunders et al. |
| 2013/0191915 | A1 | 7/2013 | Antonakakis et al. |
| 2013/0196649 | A1 | 8/2013 | Paddon et al. |
| 2013/0227691 | A1 | 8/2013 | Aziz et al. |
| 2013/0246370 | A1 | 9/2013 | Bartram et al. |
| 2013/0263260 | A1 | 10/2013 | Mahaffey et al. |
| 2013/0291109 | A1 | 10/2013 | Staniford et al. |
| 2013/0298243 | A1 | 11/2013 | Kumar et al. |
| 2013/0305368 | A1* | 11/2013 | Ford .................... G06F 21/568 726/23 |
| 2013/0312099 | A1* | 11/2013 | Edwards ............... G06F 21/554 726/24 |
| 2014/0053260 | A1 | 2/2014 | Gupta et al. |
| 2014/0053261 | A1 | 2/2014 | Gupta et al. |
| 2014/0082228 | A1* | 3/2014 | Kalemkarian ...... G06F 11/0757 710/18 |
| 2014/0130158 | A1 | 5/2014 | Wang et al. |
| 2014/0137180 | A1 | 5/2014 | Lukacs et al. |
| 2014/0169762 | A1 | 6/2014 | Ryu |
| 2014/0179360 | A1 | 6/2014 | Jackson et al. |
| 2014/0328204 | A1 | 11/2014 | Klotsche et al. |
| 2014/0337836 | A1 | 11/2014 | Ismael |
| 2014/0351935 | A1 | 11/2014 | Shao et al. |
| 2015/0096025 | A1 | 4/2015 | Ismael |

FOREIGN PATENT DOCUMENTS

| | | |
|---|---|---|
| WO | 02/23805 A2 | 3/2002 |
| WO | 02/006928 A2 | 8/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

NPL Search Results (Year: 2020).*
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Mori, Detecting Unknown Computer Viruses, 2004, Springer-Verlag Berlin Heidelberg.

(56) References Cited

OTHER PUBLICATIONS

Oberheide et al., CloudAV.sub.-N-Version Antivirus in the Network Cloud, 17th USENIX Security Symposium USENIX Security '08 Jul. 28-Aug. 1, 2008 San Jose, CA.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.jsp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen").
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Cohen, M.I., "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, Sans Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002.)
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 SIGOPS Operating Systems Review, vol. 42 Issue 3, pp. 21-28.
Hjelmvik, Erik , "Passive Network Security Analysis with NetworkMiner", (IN)Secure, Issue 18, (Oct. 2008), pp. 1-100.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Kaeo, Merike , "Designing Network Security", ("Kaeo"), (Nov. 2003).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS'05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

(56) References Cited

OTHER PUBLICATIONS

Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
"Mining Specification of Malicious Behavior"—Jha et al, UCSB, Sep. 2007 https://www.cs.ucsb.edu/.about_chris/research/doc/esec07.sub.-mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).

\* cited by examiner

SYSTEM AND METHOD FOR MALWARE ANALYSIS USING THREAD-LEVEL EVENT MONITORING

1. FIELD

Embodiments of the disclosure relate to the field of data security. More specifically, embodiments of the disclosure relate to a system and method for conducting malware analysis of objects using thread-level event monitoring, where the analysis results are used to generate one or more displays that identify relationships between threads of a multi-thread process and the events associated with each particular thread.

2. GENERAL BACKGROUND

Currently, some conventional malware detection systems are configured to monitor activities associated with a process. Upon detecting an anomalous event associated with one or more of these activities, the whole process is determined to be tainted and is identified as being potentially malicious. Subsequent analysis of the process in efforts to determine which activities, if any, are malicious may be quite difficult, especially where the process performs thousands of activities and produces hundreds of anomalous events.

For instance, malware utilizing code-injection techniques typically targets a well-known system process (e.g., an executable such as Internet Explorer®, winlogon.exe, etc.). Such targeted processes are often computationally intensive as these processes may perform thousands of activities per second, where hundreds of events may be considered to be anomalous during run time. The results produced by a selected process that is executing a targeted object for analysis may yield an excessive number of anomalous events, where some (and perhaps a high percentage) of these anomalous events may constitute false positives. Hence, this conventional process monitoring scheme has accuracy concerns as the presence of a large number of anomalous events may dilute the accuracy of reports generated by the malware detection system and may obfuscate real malicious activity among those activities that may appear to be malicious but are benign.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
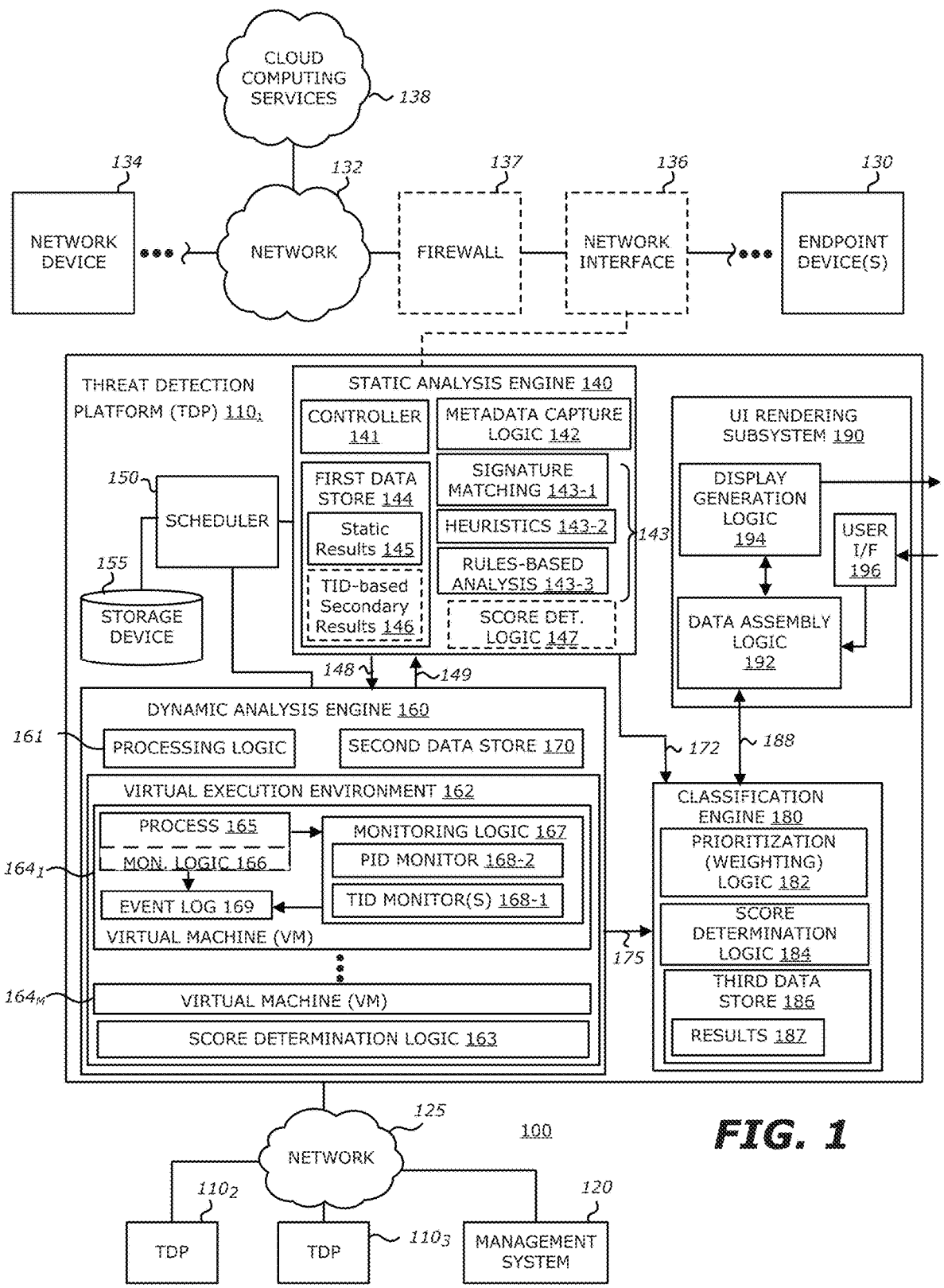
FIG. 1 is an exemplary block diagram of a network deploying a plurality of threat detection platforms (TDP).

Various embodiments of the disclosure relate to a threat detection platform that performs malware detection on a thread-by-thread basis. In lieu of determining whether an object is malicious through process based event monitoring, namely monitoring for anomalous events produced in response to operations on the object being performed by a multi-threaded process, the threat detection platform is configured to analyze whether the object is malicious through thread-level event monitoring. "Thread-level event monitoring" provides a more refined granularity in the analysis and subsequent reporting of anomalous events that may be associated with a malicious attack. For instance, according to one embodiment of the disclosure, the threat detection platform is configured to process an object under analysis, and thereafter, monitor activities resulting from the processing of the object. These activities, referred to as "events," are produced by one or more threads of execution (hereinafter, "thread(s)"). Besides monitoring the events, the threat detection platform is configured to (i) maintain an association (e.g., relationship) between the monitored events and at least their corresponding thread(s) and/or (ii) analyze the monitored events to determine whether any of these events are anomalous (and may be associated with a malicious attack).

As a result, thread-level event monitoring allows for the exclusion of certain threads from being monitored, which provides (i) concentrated monitoring for particular types of events and (ii) better accuracy in malware detection. Also, thread-level event monitoring enables the threat detection platform to provide finer analysis granularity, which now enables the platform to determine, for example, whether a particular script is malicious or not as well as provides a more reliable keylogging detection scheme.

For instance, malware can execute in several forms other than native code, most notably different types of scripts. One type of script is referred to as an application level script such as a macro in Microsoft® Office® or JavaScript® in a browser application. Another type of script is referred to as a natively supported script such as VBscripts/Windows Shell scripts, or the like. A common aspect of scripting engines is that the processing is single threaded. In other words, a specific thread interprets and executes a single scripted line. As a result, through thread-level event monitoring, events may be classified as being associated with a particular script.

Besides script-level classification of events, thread-level event monitoring provides more reliable detection of keylogging activities. Potential keylogging ability of a given object can be triggered by a thread providing fake keystrokes. If these keystrokes lead the thread to perform file or network activity, then it is a substantial proof of keylogging.

A general description of one embodiment for conducting thread-level event monitoring is described. Of course, it is evident that various modifications and changes may be made thereto without departing from the broader spirit and scope of the invention. For instance, thread-level event monitoring may be performed by logic within a threat detection platform, such as (1) a virtual machine (VM) deployed within a platform (e.g., dedicated electronic device) that monitors incoming network traffic (e.g., incoming flows that may include web-based content, email messages, etc.) for malware or (2) a security agent deployed within a platform (e.g., an endpoint device) that monitors received and/or transmitted information for malware. Alternatively, thread-level event monitoring may be performed by logic within a platform other than the VM or the security agent, such as within a hypervisor or virtual machine monitor (VMM). The VMM may configure and manage a virtual environment including one or more virtual machines and communications between the virtual machine(s) and other parts of the overall system. The VMM may be, for example, logic that is deployed as an interface between the guest operating system and either the host operating system or the hardware (e.g., semiconductor chip(s)) of an endpoint or other electronic device.

With respect to VM-based deployment within any type of threat detection platform, one or more multi-thread processes are selected to virtually process the object in order to determine, often without processing the object by the targeted endpoint device, whether the object may be associated with a malicious attack. Each process is assigned a process identifier (referred to as a "PID"), which may be a unique value (e.g., monotonic increasing value, monotonic decreasing value, random number, alphanumeric value, etc.) or a non-unique number that may be re-used after a prolonged period of time has elapsed. The selection of the process(es) is based, at least in part, on the type of object under analysis.

For instance, where the object is a non-executable, the process may be a particular application that processes the object. As an illustrative example, where the object is a Portable Document Format (PDF) document, the process selected may include a type of PDF reader (e.g., a selected version of Adobe® Reader® software such as Adobe® Reader® version 11). As another illustrative example, where the object is a Word document, the process selected may include a version of Microsoft® Word (e.g., a selected version of Microsoft® Word such as Microsoft® Word 2013). Where the object is an executable, the process may be a particular version of an operating system (e.g., Mac® OS X, iOS 7, Windows® 8, Windows® Server 2012, or Linux® OS).

According to one embodiment of the disclosure, as the process commences, one or more threads (also represented as "thread(s)") are executed concurrently or successively to perform various operations on the object under analysis in a virtual environment (e.g., open (file) operation, close (file) operation, select a Uniform Resource Locator "URL", etc.). The results of these operations, referred to as "events," are monitored. At a time prior to, during or subsequent to virtual execution of each thread, a thread identifier (referred to as "TID") is assigned to that thread, where the TID may be a unique or non-unique value as described above. Information associated with the events that result from the execution of the threads is received by monitoring logic, which may execute within or outside the selected process.

According to one embodiment of the disclosure, the monitoring logic may be configured to monitor events produced by one or more threads associated with a process in operation and to store information associated with monitored events into an event log. The information may include (1) an identifier associated with the monitored event (e.g., TID and/or PID and TID), and (2) information directed to (a) the type of event and (b) information associated with that particular activity. As an example, with respect to an event associated with an attempt to establish a network connection, the information associated with that particular activity may include (i) socket number, (ii) remote IP address associated with the socket; (iii) local IP address (iv) local port number; and/or (v) remote port number. For an event, such as opening of a file for example, the information associated with that particular activity may include (i) file name; (ii) communication path; and/or (iii) access permissions.

This monitoring logic also maintains the relationship between the processes, threads, and events. For instance, the monitoring logic may be configured to maintain information directed to inter-PID, PID-TID, inter-TID, and/or PID-TID-Event relationships. As an illustrative example, the monitoring logic may be configured to maintain information directed to the relationship between a PID, one or more TIDs for that corresponding PID (or even another TID) and the detected events corresponding to each of the TID(s). Such information may be used for subsequent storage and later retrieval of information associated with the threads for review by security personnel. For instance, the information may be used to generate one or more display representations that illustrate the relationships between the PID(s) and TID(s), including whether any TID(s) are generated during the processing of another thread. Also, a PID/TID/Event tuple may be maintained in the event log to identify which thread and process is associated with a particular event.

With respect to one embodiment of the disclosure, logic different than the monitoring logic, such as score determination logic for example, may be responsible for subsequently determining, perhaps based on a set of rules or policies, which of the monitored events is anomalous. As an alternative, the information associated with the events may be used by the monitoring logic in determining whether or not the monitored event is anomalous, such as an unexpected or abnormal activity when compared using rules or policies. The rules or policies on which the determination is based may include rules of operation, policies that may be set by a system administrator or security IT personnel, expected protocols or formats, or the like.

Besides maintaining information for each event in an event log, along with its PID and corresponding TID, information that includes a generalized description of the operability of the thread (referred to as "task") may be received or generated by the monitoring logic and stored in the event log. For instance, in response to a thread loading and subsequently processing a dynamic link library (DLL), a task assigned to the thread may include the description "DLL Execution". As another illustrative example, in response to a thread loading and executing a macro that is part of a file under analysis, that task assigned to the thread may include the description "Macro Execution."

Hence, for each anomalous (and/or non-anomalous) event detected during execution of threads associated with a process that is selected to conduct dynamic analysis of an object, the PID, TID, information associated with the monitored event and the task are stored within the event log. The event log data is accessible to a rendering subsystem to display information associated with the events such as rendering a thread-level display that illustrates the inter-relationship between the processes, threads and events.

Additionally or as an alternative, information associated with events stored in the event log, where such events have been determined by the monitoring logic (or score determination logic) as being anomalous, may be used by a classification engine (described below) to generate a corresponding score associated with the event (e.g., a value determined by score determination logic that indicates a computed likelihood of the anomalous event is associated with a malicious attack). The score may be used by the rendering subsystem to identify those events that have a high likelihood of being associated with a malicious attack (e.g., the score exceeds a certain threshold that may be static or dynamic).

As a result, the threat detection platform comprises monitoring logic that is configured to monitor and report script execution. For example execution of macros in Microsoft® Office® files, execution of Visual Basic (VB) script by Windows® Script Host, JavaScript® execution in a browser, or the like. Additionally, or in the alternative, the monitoring logic of the threat detection platform may be configured (i) to allow for precise tracking of activities of injected code within the object under analysis, (ii) with a dynamic ability to enable and/or disable monitoring for certain threads resulting in more relevant reporting of potential malicious activity, (iii) to report events with more refined granularity in analysis of such events, and (iv) to add/remove thread selection criteria to concentrate monitored analysis only on certain types of events associated with the selected thread.

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing or storage circuitry may include, but is not limited or restricted to a processor; one or more processor cores; a programmable gate array; a microcontroller; an application specific integrated circuit; receiver, transmitter and/or transceiver circuitry; semiconductor memory; or combinatorial logic, or combinations of one or more of the above components.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "object" generally refers to a collection of data, such as a file, a message, a packet or a group of related packets for example, normally having a logical structure or organization that enables classification for purposes of analysis or storage. For instance, an object may be a self-contained element, where different types of such objects may include an executable file, non-executable file (such as a document or a dynamically link library), a Portable Document Format (PDF) file, a JavaScript™ file, Zip™ file, a Flash file, a document (for example, a Microsoft Office® document), an email, downloaded web page, an instant message in accordance with Session Initiation Protocol (SIP) or another messaging protocol, or the like. Also, in a broader sense, an object may constitute a flow, namely a collection of related objects communicated during a single communication session (e.g., Transport Control Protocol "TCP" session), perhaps between two electronic devices.

In general, a "process" is an instance of software that is executed, sometimes in a virtual environment, for processing of an object. Each process includes multiple threads of execution ("threads"), where each thread is responsible for processing the object under analysis. The threads may operate successively or concurrently within the process, and share state information, memory and other process resources.

A "platform" generally refers to an electronic device that includes a housing that protects, and sometimes encases, circuitry with data processing, storage functionality and/or network connectivity. Examples of a platform may include a server or an endpoint device that may include, but is not limited or restricted to a stationary or portable computer including a desktop computer, laptop, electronic reader, netbook or tablet; a smart phone; a video-game console; or wearable technology (e.g., watch phone, etc.).

A "message" generally refers to information transmitted as information in a prescribed format, where each message may be in the form of one or more packets or frames, a Hypertext Transfer Protocol (HTTP) based transmission, or any other series of bits having the prescribed format. "Metadata" is information that describes data (e.g., a particular object or objects constituting a flow, a flow, etc.).

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architectures and Methods of Operations

Referring to FIG. 1, an exemplary block diagram of a network 100 deploying a plurality of threat detection platforms (TDP) $110_1$-$110_N$ (N>1, where N=3 for this embodiment) communicatively coupled to a management system 120 via a network 125 is shown. In general, the management system 120 is adapted to manage each TDP 110$_1$-110$_3$. For instance, the management system 120 may be configured to perform content updates (e.g., upload new rules or modified rules, delete rules, modify parameters that are utilized by the rules and/or upload metadata) within a static analysis engine 140, a dynamic analysis engine 160, a classification engine 180, and/or a rendering subsystem 190.

As shown in FIG. 1, a first threat detection platform (TDP) 110$_1$ is an electronic device that is adapted to analyze information associated with incoming data (e.g., network traffic, input data over a communication network 132, input data from another type of transmission medium, etc.) from/to one or more endpoint devices 130. As this illustrative embodiment, the communication network 132 may include a public network such as the Internet, a private network (e.g., a local area network "LAN", wireless LAN, etc.), or a combination thereof. Herein, the first TDP 110$_1$ is communicatively coupled with the communication network 132 via an interface 136.

In general, the interface 136 operates as a data capturing device (sometimes referred to as a "network tap") that is configured to receive at least a portion of network traffic propagating to/from one or more endpoint devices 130 (hereinafter, "endpoint device(s)") and provide information associated with the received portion of the network traffic to the first TDP 110$_1$. This information may include metadata and may be a duplicated copy of the portion of received network traffic. Alternatively, although not shown, the interface 136 may be configured to receive files or other objects that are not provided over a network. For these purposes, the interface 136 may be a data capturing device that automatically, e.g., on command, accessing data stored in a storage system or another type of interface, such as a port, for receiving objects manually provided via a suitable dedicated communication link or from storage media such as portable flash drives.

In general terms, the interface 136 is configured to capture data directed to or from one or more endpoint device(s) 130, where the captured data includes at least one object for analysis and its corresponding metadata. According to one embodiment of the disclosure, the metadata may be used, at least in part, to determine protocols, application types and other information that may be used by logic (e.g., scheduler 150) within the first TDP 110$_1$ to determine particular software profile(s). The software profile(s) are used for selecting and/or configuring (i) one or more virtual machines 164$_1$-164$_M$ (M≥1) within a virtual execution environment 162 of the dynamic analysis engine 160, (ii) a VMM or (iii) one or more security agents, as described below. These software profile(s) may be directed to different software or different versions of the same software application extracted from software image(s) fetched from a storage device 155.

In some embodiments, although not shown, interface 136 may be contained within the first TDP 110$_1$. In other embodiments, the interface 136 can be integrated into an intermediary device in the communication path (e.g., a firewall, router, switch or other networked electronic device) or can be a standalone component, such as an appropriate commercially available network tap.

As further shown in FIG. 1, the first TDP 110$_1$ includes static analysis engine 140, scheduler 150, storage device 155, dynamic analysis engine 160, classification engine 180, and rendering subsystem 190. Herein, the static analysis engine 140 may include one or more controllers 141 (e.g., processing circuitry such as one or more processors) that features metadata capture logic 142 and static analysis logic 143. Of course, it is contemplated that the controller(s) 141 may be separate from the static analysis engine 140 but having access to logic within the static analysis engine 140.

The metadata capture logic 142 is responsible for extracting and/or generating metadata contained with and/or associated with incoming data (e.g., network traffic). The metadata may be identified as being associated with a particular object under analysis (e.g., assigned an identifier "object_ID" or stored in a specific storage location to identify that the metadata corresponds to the particular object), temporarily stored in a first data store 144 as part of static results 145. Examples of types of the metadata may include, but are not restricted or limited information associated with the object such as a type of object, a type of application that created the object such as Word® version or PDF version, or host name of a source of the object. This metadata is subsequently used for configuring one or more VMs 164$_1$-164$_M$ within the virtual execution environment 162 for conducting a dynamic analysis of the object associated with that metadata.

In addition to, or in lieu of the metadata associated with the source of the object, it is contemplated that additional metadata associated with the endpoint device(s) 130 targeted to receive the object may have been received by the first TDP 110$_1$ and stored in the first data store 144. Examples of this additional metadata may include device type, MAC address, the particular software configurations of the endpoint device(s) 130, or the like.

Referring still to FIG. 1, the static analysis logic 143 includes one or more software modules that, when executed by controller(s) 141, analyzes characteristics for one or more incoming objects, which may be a portion of network traffic according to this embodiment of the disclosure. Such analysis may involve a static analysis of the characteristics of each object under analysis, where the static analysis includes one or more checks being conducted on the object without its execution. Examples of the checks may include signature matching 143-1 to conduct (a) exploit signature checks, which may be adapted to compare at least a portion of the object under analysis with one or more pre-stored exploit signatures (pre-configured and predetermined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these checks may include (i) heuristics 143-2, which is based on rules or policies as applied to the object and may determine whether one or more portions of the object under analysis is associated with an anomalous or suspicious characteristic (e.g., a particular URL associated with known exploits, or a particular source or destination address etc.) associated with known exploits; or (ii) determinative rule-based analysis 143-3 that may include blacklist or whitelist checking.

Upon static analysis of the object under analysis, the static analysis engine 140 determines whether this object is "suspicious," namely the object has characteristics that suggest it is associated with a malicious attack. As a result, the static analysis engine 140 may route this suspicious object to the dynamic analysis engine 160 for more in-depth analysis. Also, the results 145 of the static analysis may be stored within the first data store 144. The static analysis results 145 may include (i) a static analysis score (described below) and/or (ii) metadata associated with the object. The metadata may include (a) characteristics associated with malware (e.g., matched signature patterns, certain heuristic or statistical information, etc.), and/or (b) other types of metadata associated with the object under analysis (e.g., name of malware or its family based on the detected exploit signature, anticipated malicious activity associated with this type of malware, etc.).

According to one embodiment of the disclosure, in addition (or in the alternative) to being stored in the first data store 144, some or all of the static analysis results 145 may be subsequently routed to classification engine 180 for use in prioritization and score determination. Additionally or in the alternative, the static analysis engine 140 may include a score determination logic 147, which is configured to determine a probability (or level of confidence) that a suspicious object 148 is part of a malicious attack. More specifically, based on the static analysis, the score determination logic 147 generates a value (referred to as a "static analysis score") that may be used, in part, by the classification engine 180 to identify the likelihood that the suspicious object 148 is part of a malicious attack.

After analysis of the object, the static analysis engine 140 may route the suspicious object 148 to the dynamic analysis engine 160, which is configured to provide more in-depth analysis by analyzing the suspicious object 148 in a VM-based operating environment. Although not shown, the suspicious object 148 may be buffered by the first data store 144 or a second data store 170 until ready for processing by virtual execution environment 162. Of course, if the object under analysis is not suspected of being part of a malicious attack, the static analysis engine 140 may simply denote that the object is benign and refrain from passing the object to the dynamic analysis engine 160 for analysis.

More specifically, after analysis of the characteristics of the suspicious object 148 has been completed, the static analysis engine 140 may provide some or all of the suspicious object 148, which may be identified by an assigned object_ID, to the dynamic analysis engine 160 for in-depth dynamic analysis by one or more VMs $164_1$-$164_M$ of the virtual execution environment 162. For instance, the virtual execution environment 162, operating in combination with processing logic 161 (described below), is adapted to simulate the transmission and/or receipt of signaling of a flow by a destination device represented by VM $164_1$.

According to one embodiment, the scheduler 150 may be adapted to configure one or more VMs $164_1$-$164_M$ based on metadata associated with the flow that includes the object under analysis 148. For instance, the VMs $164_1$-$164_M$ may be configured with software profiles corresponding to the software images stored within storage device 155. As an alternative embodiment, the VMs $164_1$-$164_M$ may be configured according to one or more software configurations that are being used by electronic devices connected to a particular enterprise network (e.g., endpoint device(s) 130) or prevalent types of software configurations (e.g., a Windows® 7 OS; a certain version of a particular web browser such as Internet Explorer®; Adobe® PDF™ reader application). As yet another alternative embodiment, the VMs $164_1$-$164_M$ may be configured to support concurrent virtual execution of a variety of different software configurations in efforts to verify that the suspicious object is part of a malicious attack. Of course, it is contemplated that the VM configuration described above may be handled by logic other than the scheduler 150.

According to one embodiment of the disclosure, the dynamic analysis engine 160 is adapted to execute one or more VMs $164_1$-$164_M$ to simulate the receipt and execution of content associated with the suspicious object 148 within a run-time environment as expected by the type of object. For instance, dynamic analysis engine 160 may optionally include processing logic 161 to emulate and provide anticipated signaling to the VM(s) $164_1$, . . . , and/or $164_M$ during virtual processing. As an example, the processing logic 161 may be adapted to provide, and sometimes modify, information associated with the suspicious object 148 (e.g., IP address, etc.) in order to control return signaling back to the virtual execution environment 164.

As further shown in FIG. 1, after configuration and upon execution, VM $164_1$ is configured to run a multi-thread process 165 that controls operability of the object during analysis. For instance, where the object is a PDF file for example, the process 165 may be a PDF reader that controls virtual processing of the PDF file, such as opening/closing of the PDF file, reading the PDF file, and/or writing data into the PDF file after entering into a selected mode of operation (e.g., typewriter, highlighter, etc.).

Figure 2:
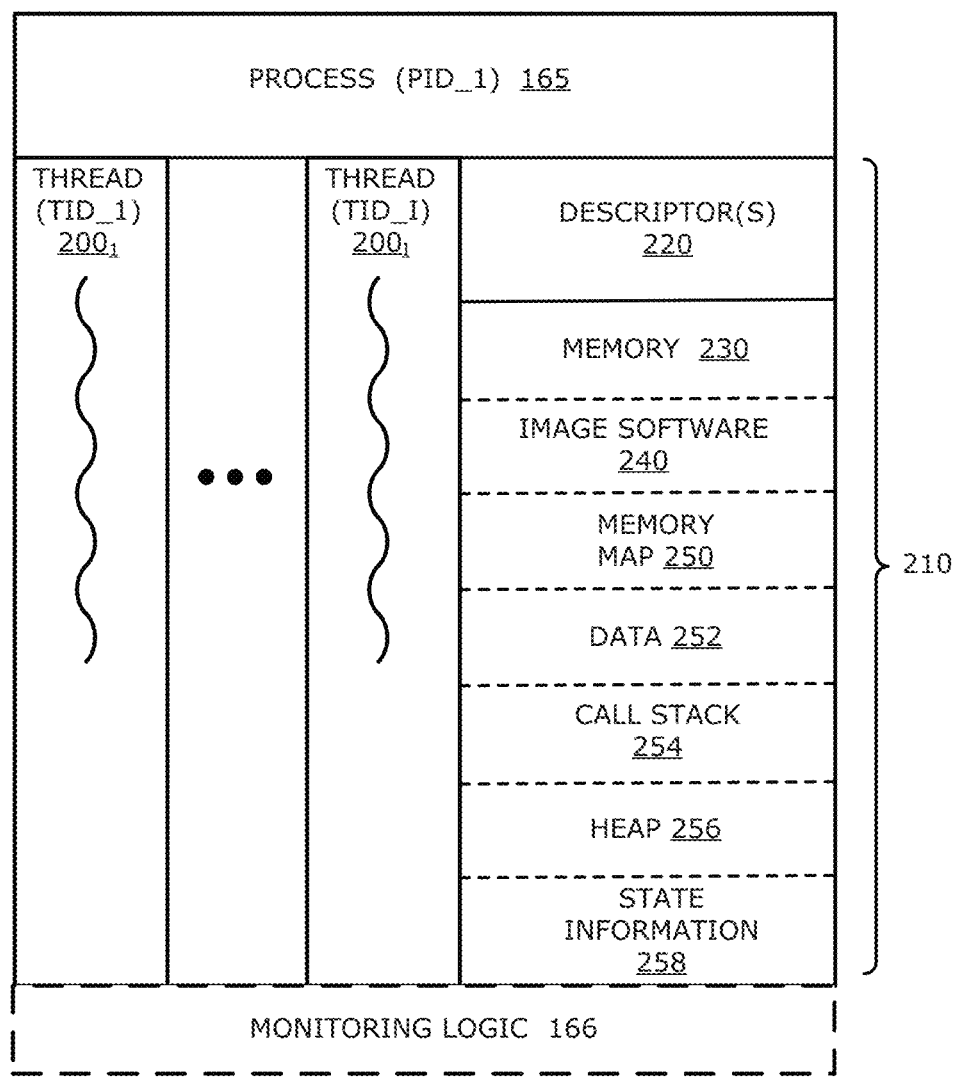
FIG. 2 is an exemplary block diagram of a process.

More specifically, as shown in FIG. 2 as an illustrative embodiment, the process 165 comprises one or more threads $200_1$-$200_I$ (e.g., I≥1) that may operate concurrently and/or sequentially with each other in order to perform various operations on the object 148. The various operations may cause certain activities (e.g. actions) and/or inactivities (e.g. inactions) to occur such as creating a file or document, accessing or setting a registry, opening or closing a file, and/or power management such as entering sleep or a hibernate state. These activities and/or inactivities (hereinafter "events") are monitored by monitoring logic. The process 165 is assigned a process identifier (e.g., PID_1) at the time of, prior to, or subsequent to conducting virtual processing by VM $164_1$ of FIG. 1, where the PID_1 may be a unique or non-unique number as described above.

As still shown in FIG. 2, the process 165 comprises an instance of executable software which includes (1) multiple threads of execution $200_1$-$200_I$ that may execute instructions concurrently and (2) resources 210 for the process 165. For instance, as shown, the process 165 includes descriptors 220 for resources that are allocated to the process 165 (e.g., file handles, etc.) and a memory 230 (e.g., a region of virtual memory). The memory 230 may be adapted to store an image of the executable software associated with the particular process (e.g., Adobe® PDF reader, Microsoft® Word, Windows®-based OS, etc.) 240, memory map 250, process-specific data (input and output) 252, a call stack 254 that keeps track of active subroutines and/or other events, a heap 256 to hold intermediate computation data generated during run time, and/or state information 258 (context) such as the content of registers, physical memory addressing or the like during thread execution.

Referring to both FIG. 1 and FIG. 2, at the time of, prior to, or subsequent to virtual execution, each particular thread $200_1$-$200_I$ is assigned a thread identifier (e.g., TID_1 . . . TID_I). According to one embodiment of the disclosure, events resulting from the execution of a particular thread (e.g., thread $200_1$), which performs operations on the object 148, may be monitored by monitoring logic 166 (e.g., logic that conducts heuristic or rule-based analysis on the events (e.g., activities and/or inactivities (omissions) by the processed object 148). Information associated with each event is uploaded for storage into an event log 169 along with its corresponding event metadata, namely information directed to the relationship between the event and its particular PID and TID (e.g., PID_1, TID_1). Hence, the monitoring logic 166 may be configured to upload information associated with all of the monitored events and corresponding event metadata (e.g., corresponding PID and TID for each event)

to the event log 169, or alternatively, upload information associated with a subset of the monitored events and their corresponding event metadata. The subset of monitored events may include anomalous events when the monitoring logic 166 is configured to conduct an analysis of a monitored event and determine, based on the analysis, whether the event is anomalous. This analysis may involve a comparison of each monitored event to an expected event, namely a particular action or inaction that may be expected to have been encountered during execution of a particular thread associated with a particular process.

According to another embodiment of the disclosure, operating in combination with or in lieu of monitoring logic 166, monitoring logic 167 that is implemented differently than the monitoring logic 166 may be configured to monitor events caused by object 148 upon execution of the same or different thread (e.g., thread $200_1$ or thread $200_2$). As described above, information associated with the monitored events is stored into the event log 169 along with their corresponding event metadata (e.g., PID_1, TID_1). Herein, the monitoring logic 167 includes one or more first monitors 168-1 (e.g., TID monitor(s) 168-1) that are adapted to monitor events associated with a particular thread and/or an optional second monitor 168-2 that monitors events associated with a particular process (e.g., PID monitor 168-2). The monitoring logic 167 uploads information associated with the events and their corresponding event metadata (e.g., forming a tuple PID/TID/Event for that particular event) into the event log 169, where the logged events may include all of the events or a subset of the monitored events such as anomalous events as described above.

It is contemplated that the monitoring logic 166 and/or 167 may include a data store with event checking attributes (e.g., signatures, rules and/or policies associated with heuristics, etc.) that may be static or dynamically modified by logic internal to the threat detection platform $110_1$ of FIG. 1 or external to the threat detection platform $110_1$ (e.g., cloud services 138 of FIG. 1). Additionally, it is contemplated that the monitoring logic 166 and/or 167 may be located inside (as shown) outside a virtual machine (e.g., VM $164_1$) while still adapted to monitor events associated with one or more VMs $164_1$-$164_M$ within the virtual execution environment 162, a virtual machine monitor (VMM), or other types of logic. It is further contemplated that the monitoring logic 166 and/or 167 may operate in conjunction with the process 165.

Although not shown, it is contemplated that the dynamic analysis engine 160, and in particular the virtual execution environment 162, may feature thread selection logic. The thread selection logic is configured to use information associated with the object under analysis 148 and available to the dynamic analysis engine 160 to configure the virtual execution environment 162 to monitor for activities of prescribed threads and ignore activities of other threads in the process 165. This information may include, for example, the type of object (e.g., .exe, pdf, etc.), and/or the type of application to be used to load or open the object (e.g., browser, word processing program). For instance, the thread selection logic may be configured to select threads for monitoring that are related to prescribed types of functions or activities within the process 165, for example, a specific function call made by certain modules within the process, e.g., a call signifying start of macro execution, a thread created by a suspicious entity, or a thread created by the dynamic analysis engine 160 itself to monitor specific induced activities. The thread selection logic may also ignore and not monitor, for certain types of objects, particular threads, e.g., threads checking for software updates to a browser.

Besides each event, along with its PID and corresponding TID, information that provides a generalized description of the operations being conducted by the thread (referred to as "task") may be received or generated by the monitoring logic 166 and/or 167 and subsequently provided to the event log 169. More specifically, based on the type of execution being conducted by a thread, one of a plurality of descriptions is obtained from a pre-stored list of descriptions to identify the operations conducted by the thread.

Hence, for each event detected during virtual execution of threads associated with a process that is selected to conduct dynamic analysis of an object, a tuple inclusive of the PID, TID and the monitored event is stored within the event log 169 along with the optional task id that describes the operations conducted by the thread. The contents of the event log 169 may be temporarily stored in second data store 170 and/or uploaded to the classification engine 180 and accessible to the rendering subsystem 190 to extract such information for display of the detected anomalous events as well as thread-level display that illustrates the inter-relationship between the processes, threads and/or events.

Referring still to FIG. 1, the dynamic analysis engine 160 provides VM-based results 175 to the classification engine. According to one embodiment of the invention, the VM-based results 175 include information associated with the detected events, including the tuple for each event (e.g., PID/TID/Event) along with metadata associated with the event (e.g., PID associated with the event, TID associated with the event and/or task associated with the event). Of course, the VM-based results 175 may include additional metadata pertaining to the targeted process and/or network device learned through virtual processing (e.g., particular type and/or version of application or operating system).

According to another embodiment of the disclosure, the monitoring logic 167, such as TID monitors 168-1 for example, may be further responsible for detection of anomalous events associated with the suspicious object 148. In particular, upon detecting an anomalous event, the monitoring logic may operate in concert with an optional score determination logic 163 to generate a score associated with the anomalous event, namely a value that indicates the likelihood of the anomalous event is associated with a malicious attack. This score, and perhaps an aggregate of the scores that is referred to as the "dynamic analysis score," may be provided as part of the VM-based results 175 associated with the suspicious object to classification engine 180. According to this illustrative embodiment, the VM-based results 175 may include one or more of the following: the dynamic analysis score; information associated with the detected anomalous events; metadata associated with the each event (e.g., PID, TID, task, and/or score); and/or additional information pertaining to the malware and/or targeted network device learned through virtual processing such as malware name, malware family, type of malicious activity (e.g., email phishing, callback, etc.), date of detection, targeted process (e.g., particular type and/or version of application or operating system), and/or any other information associated with the detected malicious activity by the suspicious object 148.

As an optional feature, it is contemplated that a portion 149 of the VM-based results 175 may be returned to the static analysis engine 160. The portion 149 of the VM-based results 175 may be used by the static analysis engine 160 to conduct further processing of the object 148, which may adjust the static analysis score assigned to the object 148. The adjusted static analysis score may be re-uploaded to the classification engine 180 for use in processing.

According to one embodiment of the disclosure, the classification engine 180 includes logic that is configured to receive the VM-based result 175 and store these results in the third data store 186. As the VM-based results 175 include information associated with the monitored events and their corresponding metadata (e.g., PID, TID & task), these results may be used for generating one or more display representations that identify the correlation among several threads and/or processes linked by events that occur during thread execution.

Furthermore, in accordance with this embodiment or another embodiment of the invention, the classification engine 180 may be configured to receive the static analysis results 172 (e.g., static analysis score and corresponding metadata) and/or the VM-based results 175. Herein, the classification engine 180 includes prioritization logic 182 and/or score determination logic 184. The prioritization logic 182 may be configured to apply weighting to a portion of the VM-based results 175 provided from the dynamic analysis engine 160 and/or a portion of the static analysis results 172 provided from static analysis engine 140. For instance, a first weighting may be applied to the dynamic analysis score produced by score determination logic 163 and a second weighting different than the first weighting may be applied to the static analysis score produced by score determination logic 147. Alternatively, different weightings may be applied to the different scores produced by score determination logic 163 that are associated with different anomalous event types. Of course, it is contemplated that some or all of the other information within the VM-based results 175, such as information associated with the anomalous and/or non-anomalous events along with their corresponding relationship information (e.g., PID, TID, and/or task description) for example, may be stored in third data store 186 as analysis results 187 without being operated upon by the prioritization logic 182 and/or the score determination logic 184.

According to one embodiment of the disclosure, the score determination logic 184 includes one or more software modules that are used to determine a final probability as to whether the suspicious object 148 is part of a malicious attack. The resultant (final) score representative of this final probability that the object 148 is associated with a malicious attack may be included as part of analysis results 187, which may be subsequently stored along with information associated with the detected events and their corresponding metadata (PID, TID & Task). Where the score determination logic 184 has failed to determine whether the suspicious object 148 is malicious, based on the static analysis results 172 (e.g., static analysis score, etc.) and/or the VM-based results 175 (e.g., dynamic analysis score, etc.), the classification engine 180 may still assign a resultant score, which may be used for highlighting or color coding items within a display representation (e.g., display items representing a certain PID, TID and/or event, connection lines linking the display items, etc.) as being associated with a malicious attack or not.

Herein, according to one embodiment of the disclosure, the rendering subsystem 190 includes display generation logic 194 which, under control of data assembly logic 192, is adapted to generate one or more displays that illustrate the inter-relationship between processes, threads associated with suspicious object 148. The data assembly logic 192 may be activated manually via user interface 196. Alternatively, the data assembly logic 192 may be activated automatically (without user intervention) upon detection of a malicious attack, where the display may be one of a plurality of selectable displays. Such detection of a malicious attack may be accomplished by the classification engine 180 monitoring at least a portion of the metadata (e.g., final score value computed by score determination logic 184) based on received events associated with a suspicious object 148 and activating the data assembly logic 192 when this final score value signifies an extremely high probability (e.g., greater than 95% likelihood) of a malicious attack. As yet another alternative, the data assembly logic 192 may be activated by a real-time clock (not shown) upon occurrence of a time-based scheduled event that allows for security personnel review in incident response operations.

Upon activation, the data assembly logic 192 may issue a request for metadata to the classification engine 180 in order to generate display(s) that illustrates the propagation of a particular malware activity through a particular thread being part of the analysis of the suspicious object 148 spawning other threads.

Figure 3:
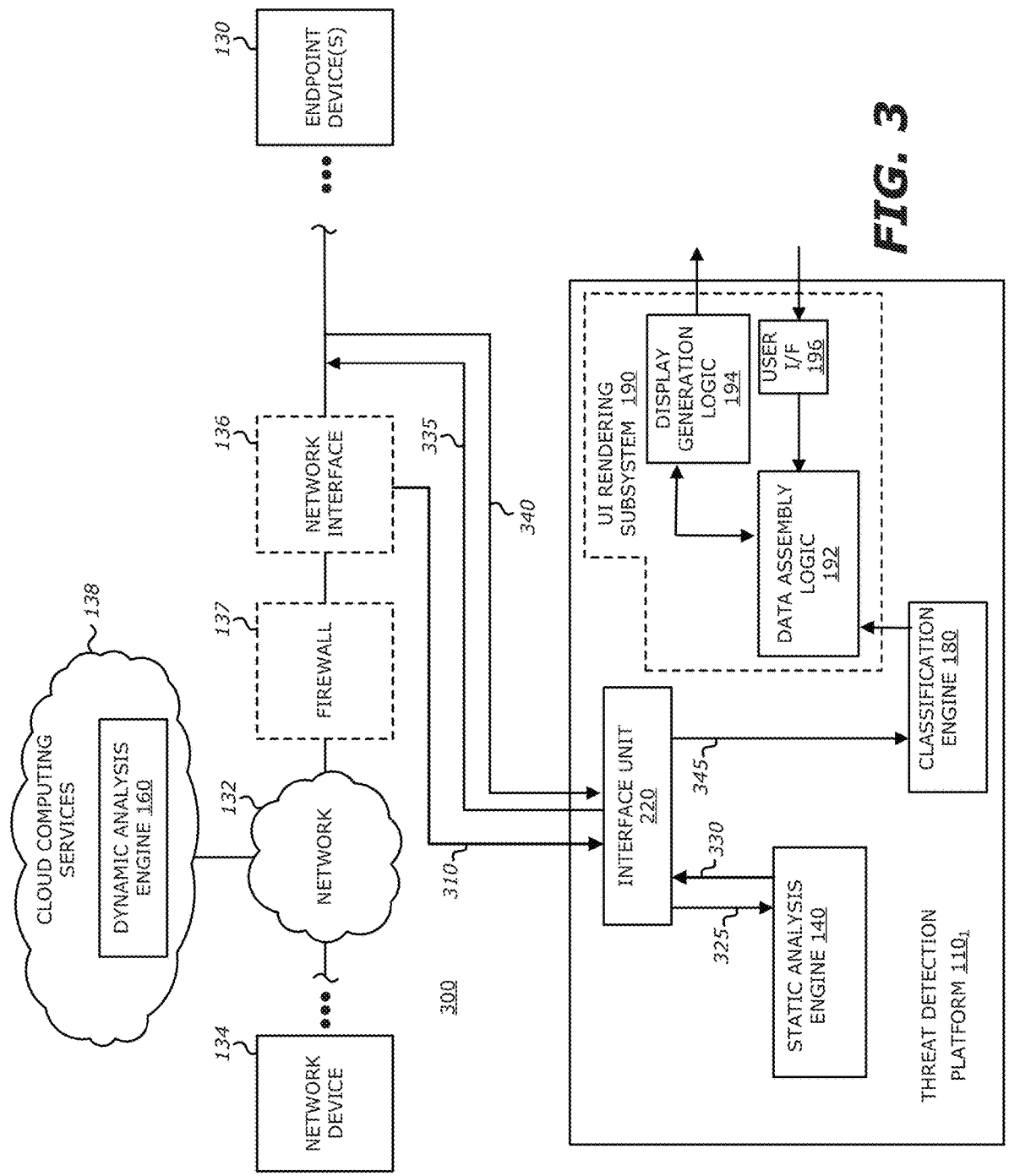
FIG. 3 is an exemplary block diagram of a second embodiment of another configuration for the TDP of FIG. 1.

Referring now to FIG. 3, a block diagram of a second embodiment of an exemplary network adapted with another configuration for the first TDP $110_1$ is shown. According to one embodiment of the disclosure, the first TDP $110_1$ may be communicatively coupled in-line with the endpoint device(s) 130. As shown, the first TDP $110_1$ may be communicatively coupled with the network 132 via an interface unit 320, which directs signaling 310 on communication network 132 to static analysis engine 140 and/or classification engine 180, given that the dynamic analysis engine 160 may be deployed in cloud computing services 138 as shown. Hence, one or more objects along with metadata in the network traffic are routed to the static analysis engine 140 via communication path 325. The suspicious objects may be routed via communication paths 330 and 335 to the dynamic analysis engine 160 in cloud computing services 138. Similarly, objects that are not determined to be at least "suspicious" may be returned for continued routing to endpoint device(s) 130 where TDP $110_1$ is implemented with network traffic blocking functionality. The VM-based results 175 of the dynamic analysis engine 160 may be routed via communication path 340 and 345 for prioritization before storage as analysis results 187 for subsequent use by the display generation logic 194.

Figure 4:
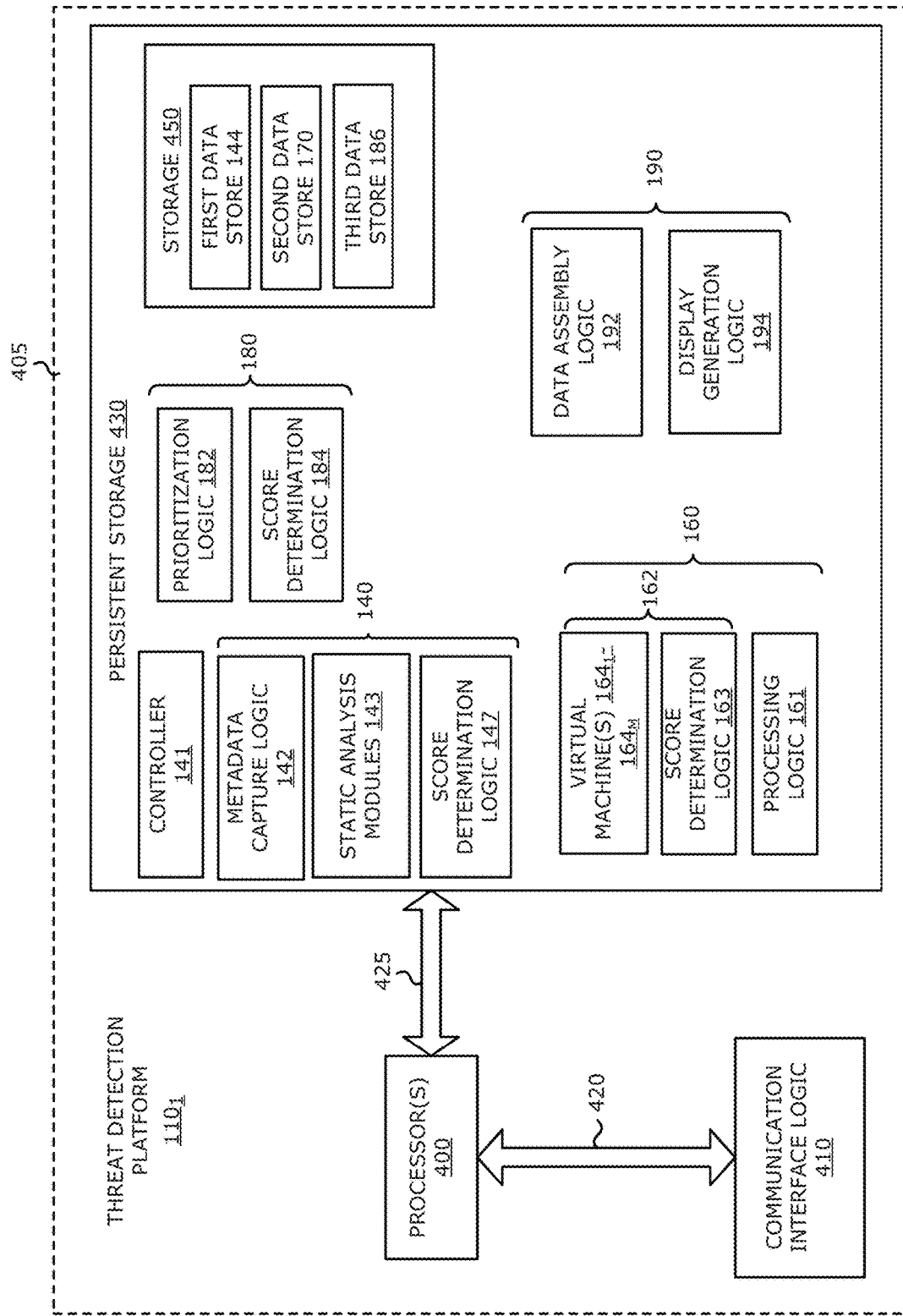
FIG. 4 is an exemplary embodiment of a logical representation of the TDP of FIG. 1.

Referring now to FIG. 4, an exemplary embodiment of a logical representation of the first TDP $110_1$ is shown. The first TDP $110_1$ includes a housing 405, which is made entirely or partially of a hardened material (e.g., hardened plastic, metal, glass, composite or any combination thereof) that protect circuitry within the housing 405, namely one or more processors 400 that are coupled to communication interface logic 410 via a first transmission medium 420. Communication interface logic 410 enables communications with other TDP $110_2$-$110_3$ and management system 120 of FIG. 1. According to one embodiment of the disclosure, communication interface logic 410 may be implemented as a physical interface including one or more ports for wired connectors. Additionally, or in the alternative, communication interface logic 410 may be implemented with one or more radio units for supporting wireless communications with other electronic devices.

Processor(s) 400 is further coupled to persistent storage 430 via transmission medium 425. According to one embodiment of the disclosure, persistent storage 430 may include (a) static analysis engine 140, including controller 141, metadata capture logic 142, static analysis logic 143 and/or score determination logic 147; (b) the dynamic analysis engine 160 that includes the processing logic 161 and logic associated with the virtual execution environment 162; (c) classification engine 180 including prioritization logic 182, score determination logic 184 and analysis results 187; (d) rendering subsystem 190 including data assembly logic 192 and display generation logic 194; and (f) data stores 144, 170 and 186. Of course, when implemented as hardware, one or more of these logic units could be implemented separately from each other.

Collective logic within the dynamic analysis engine 160 and the classification engine 180 may be configured to monitor and report script execution. For example, the execution of macros in Microsoft® Office® files, execution of Visual Basic (VB) script by Windows® Script Host, JavaScript® execution in a browser may be reported. Additionally, or in the alternative, monitoring logic within the virtual execution environment of FIG. 4 (as well as VMM 700 of FIG. 7 or the security agent 800 of FIG. 8) may be configured to allow for precise tracking of activities of injected code within an object under analysis or to add/remove thread selection criteria from event checking attributes, perhaps prompted by an external source (e.g., cloud services), which are relied upon by the monitoring logic to concentrate analysis only on certain types of events associated with the selected thread. Additionally, or in the alternative, operations of the monitoring logic (e.g., heuristics) may be dynamically modified thereby enabling and/or disabling the monitoring for certain threads resulting in more relevant reporting of potential malicious activity.

Figure 5:
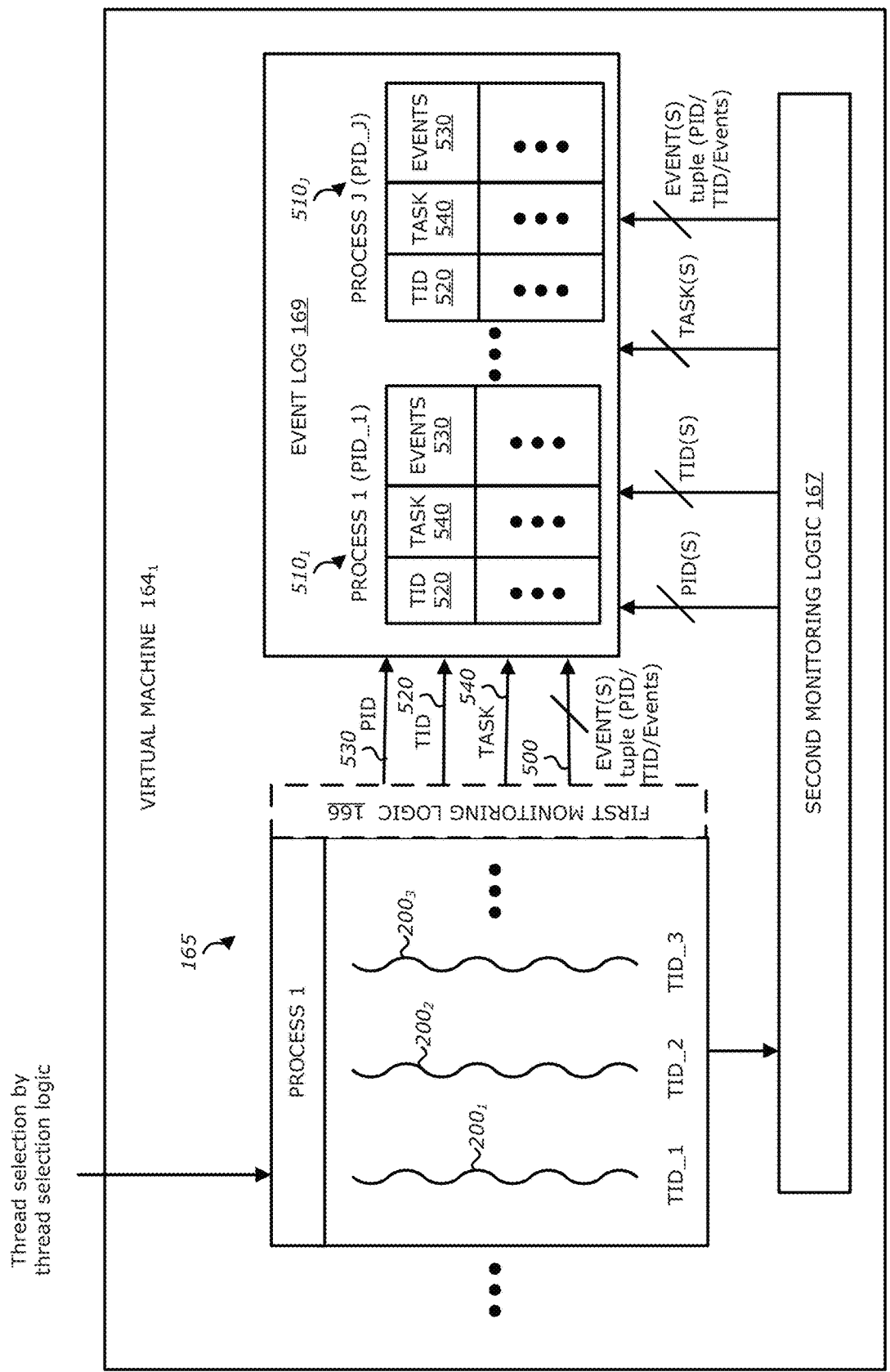
FIG. 5 is an exemplary embodiment of the operability of logic within the virtual machine (VM) deployed within the TDP of FIG. 1.

Referring to FIG. 5, an exemplary embodiment of the operability of logic within the virtual machine (VM) $164_1$ is shown, where the VM $164_1$ is configured with a process that executes an object and the events resulting from execution of the object by the process 165 are monitored. Herein, after configuration and upon execution, the VM $164_1$ starts the multi-thread process 165 that controls operability of the object under analysis. The process 165 may be assigned a process identifier (e.g., PID_1) at start time, or perhaps prior to or subsequent to conducting virtual processing by VM $164_1$, where the PID_1 may be a unique or non-unique number as described above.

For instance, where the object is a modifiable document (e.g., Microsoft® Word document), the process 165 comprises one or more threads $200_1$-$200_I$ each of which contributes to the virtual processing of the document during dynamic analysis. For instance, different threads $200_1$-$200_I$ may be responsible for conducting different operations, including opening the document, closing the document, writing data into the document, saving the data within the document, creating a new document, or the like. Each particular thread $200_1$-$200_I$ is also assigned a thread identifier (e.g., TID_1 . . . TID_I) which also may be a unique or non-unique number as described above. The results of these operations (events) may be monitored by the monitoring logic 166 and/or 167.

According to one embodiment of the disclosure, events 500 resulting from the execution of a particular thread (e.g., TID_1 $200_1$) that performed operations on the object (not shown) may be monitored by the monitoring logic 166. Information associated with these events 500 is uploaded into the event log 169, which stores this information along with event metadata, namely information directed to the PID and TID associated with the event (e.g., PID_1, TID_1). For instance, as shown for illustration purposes, the storage may be accomplished through tables $510_1$-$510_J$ (J≥1) associated with each process (e.g., process PID_1 165 and other processes PID_2-PID_J not shown). Herein, each table $510_1$-$510_J$ includes the TIDs 520 associated with that process 530, the events 500 associated with each of the TIDs 520. It is contemplated that, for maintaining the relationships between tasks (described below) with the PIDs, TIDs and events, the events 500 may be identified by PID/TID from events as shown.

As shown, the monitoring logic 166 may be configured to upload all of the monitored events and corresponding event metadata to event log 169 regardless as to whether these events are anomalous or not. Alternatively, to reduce requisite storage and event management, the monitoring logic 166 may be configured to determine whether the event is anomalous so that only a subset of the total number of monitored events and their corresponding event metadata is uploaded into the event log 169. Such determination as to whether the event is anomalous or not may involve (i) a comparison of each monitored event to an expected event, namely a particular action or inaction that is normally encountered during execution of a particular thread associated with a particular process; and/or (ii) determination whether the monitored event violates a particular rule or policy associated with the particular thread of execution.

Besides correlating each event with its corresponding process (PID) and thread (TID), a generalized description of the event (e.g., task 540), which is produced by execution of a thread (e.g., thread $200_1$) or generated by the monitoring logic 166 and/or 167, is also provided to the event log 169. For instance, the task 540 may identify that the thread $200_1$ is directed to a particular activity (e.g., macro execution or DLL execution, etc.). Hence, for each anomalous event detected during virtual execution of selected threads $200_1$-$200_I$ associated with the process 165, a tuple inclusive of information associated with the event along with its corresponding event metadata (e.g., at least PID and TID) is stored within the event log 169 along with the particular task information that describes the general thread functionality. Although shown to be part of the VM $164_1$, it is contemplated that the event log 169 may be a centralized data store that is accessible to all VMs $164_1$-$164_M$ supported by the virtual execution environment 162, and contents of the event log 169 may be uploaded to the classification engine 180 so that these contents are accessible to the rendering subsystem 190 for generating thread-level displays that illustrate the inter-relationship between the processes and the threads.

Figure 6:
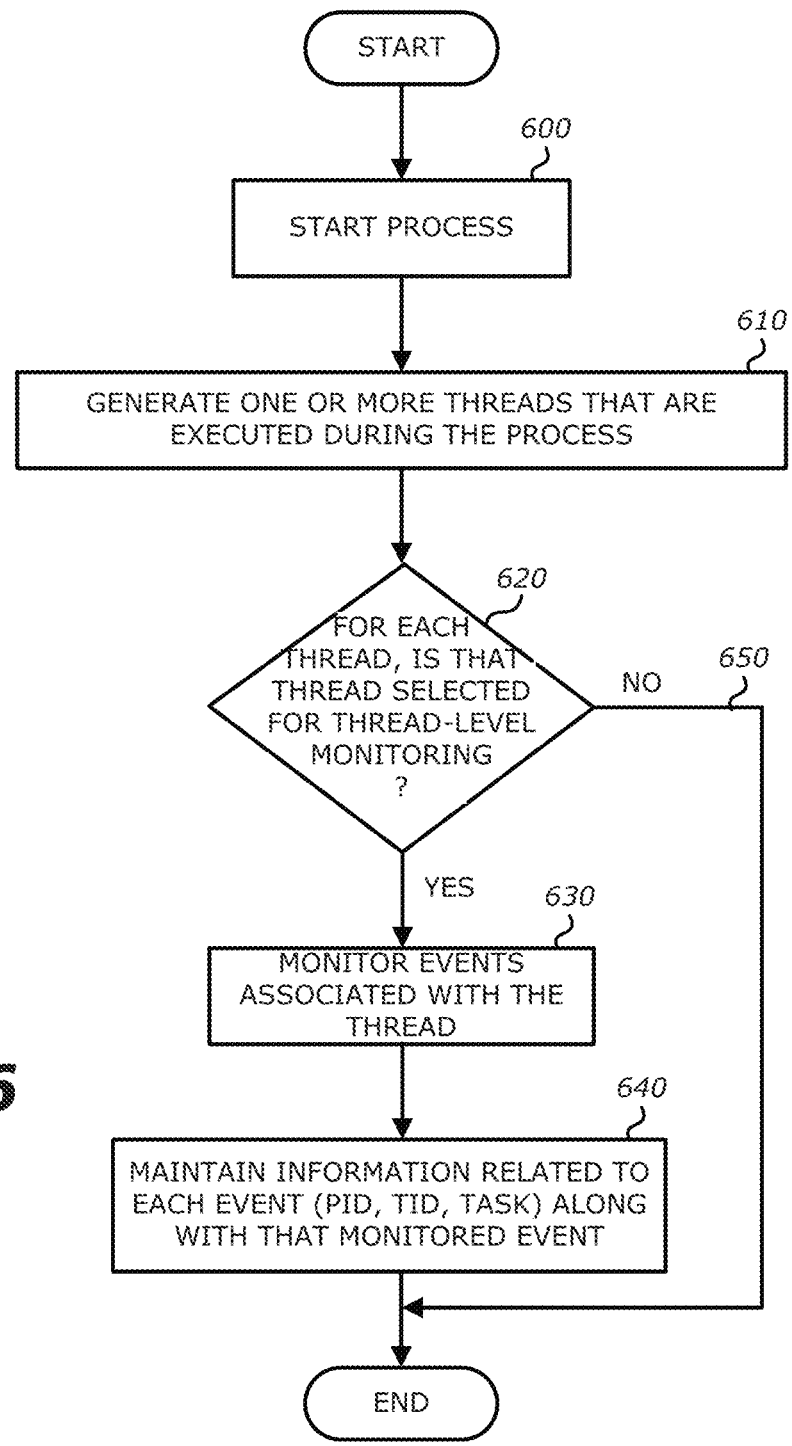
FIG. 6 is an illustrative embodiment of the operations conducted for thread-level event monitoring for malware analysis of information within an ingress flow.

Referring now to FIG. 6, an illustrative embodiment of the operations conducted for thread-level event monitoring for malware analysis of information within an ingress flow is shown. Initially, a process is started where the process is selected to conduct dynamic analysis of at least one object associated with an incoming flow (operation 600). Thereafter, one or more threads are executed by the process, in which the thread(s) perform operations on the object under analysis (operation 610). It is contemplated that a subset of the thread(s) may be selected by the thread selection logic for monitoring so that events produced based on operations from the selected threads are monitored while events produced from operations by the non-selected threads are not monitored.

For each thread, a determination is made as to whether the thread is selected for thread-level event monitoring (operation 620). If so, one or more events produced from operations on the object under analysis by the thread are monitored and information related to the event(s), such as the process identifier (PID) and thread identifier (TID) for example, is maintained with the event (operations 630 and 640). Also, the task information associated with the particular TID may be stored. Otherwise, if the thread is not selected for thread-level event monitoring, the events produced by the non-selected thread are ignored (operation 650).

Figure 7:
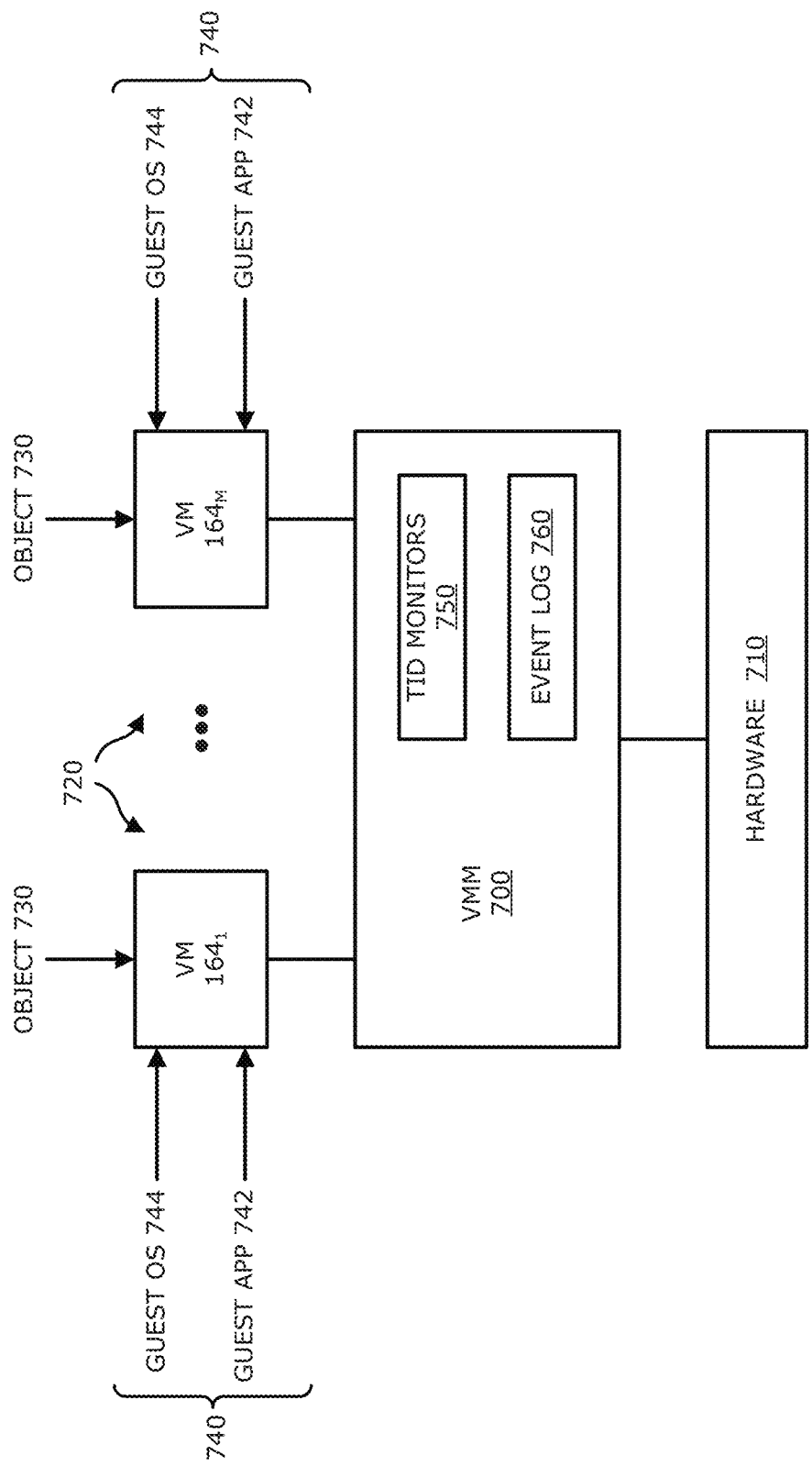
FIG. 7 is an exemplary embodiment of a network device with threat prevention and display representations being controlled by a virtual machine monitor (VMM).

As stated above, thread-level event monitoring may be performed by logic other than a virtual machine, such as within the VMM deployed within the operating system as shown in FIG. 7. Herein, the VMM 700 operates as an intermediary operation layer between hardware 710 and the virtual machines 720. According to one embodiment of the invention, the VMM 700 is part of the host operating system. As shown, the virtual machines $164_1$-$164_M$ may be configured for execution of an object 730 under analysis by a selected process 740, which may include a guest application 742 and/or a guest OS 744. The VMM 700 includes TID monitors 750 that is configured to monitor events associated with the operations by one or more threads (not shown) executed by the selected process 740, identifies and maintains metadata (e.g., the PID and/or TID) associated with the event, and stores the events along with the event metadata into an event log 760 for use in subsequent lookup and display.

Figure 8:
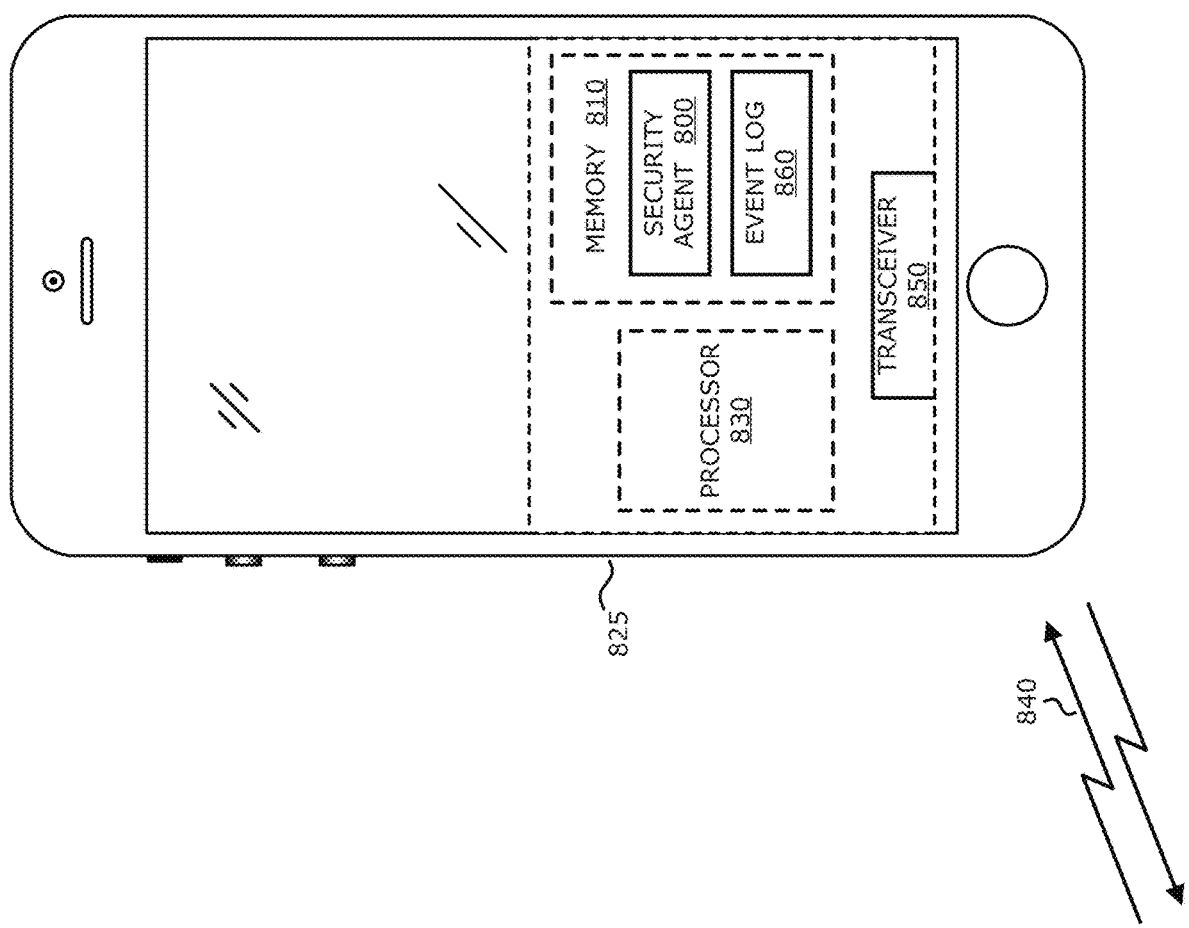
FIG. 8 is an exemplary embodiment of an endpoint device with threat prevention and display representations being controlled by a security agent.

Thread-level event monitoring also may be performed by a security agent 800 as shown in FIG. 8. Herein, the security agent 800 is stored within a memory 810 encased within a housing 825 of an endpoint device 820. Upon execution by a processor 830, the security agent 800 conducts dynamic analysis of at least a portion of information 840 received by a transceiver 850 of the endpoint device 820. As before, the security agent 800 activates a selected process and threads associated with the process perform operations on the portion of the information 850 to produce events associate with corresponding threads that are monitored. These monitored events are stored in an event log 860 within the memory 810 along with identifiers associated with the process and/or thread associated with the event.

III. Multi-Thread Display Screens of Detected Malware

Figure 9:
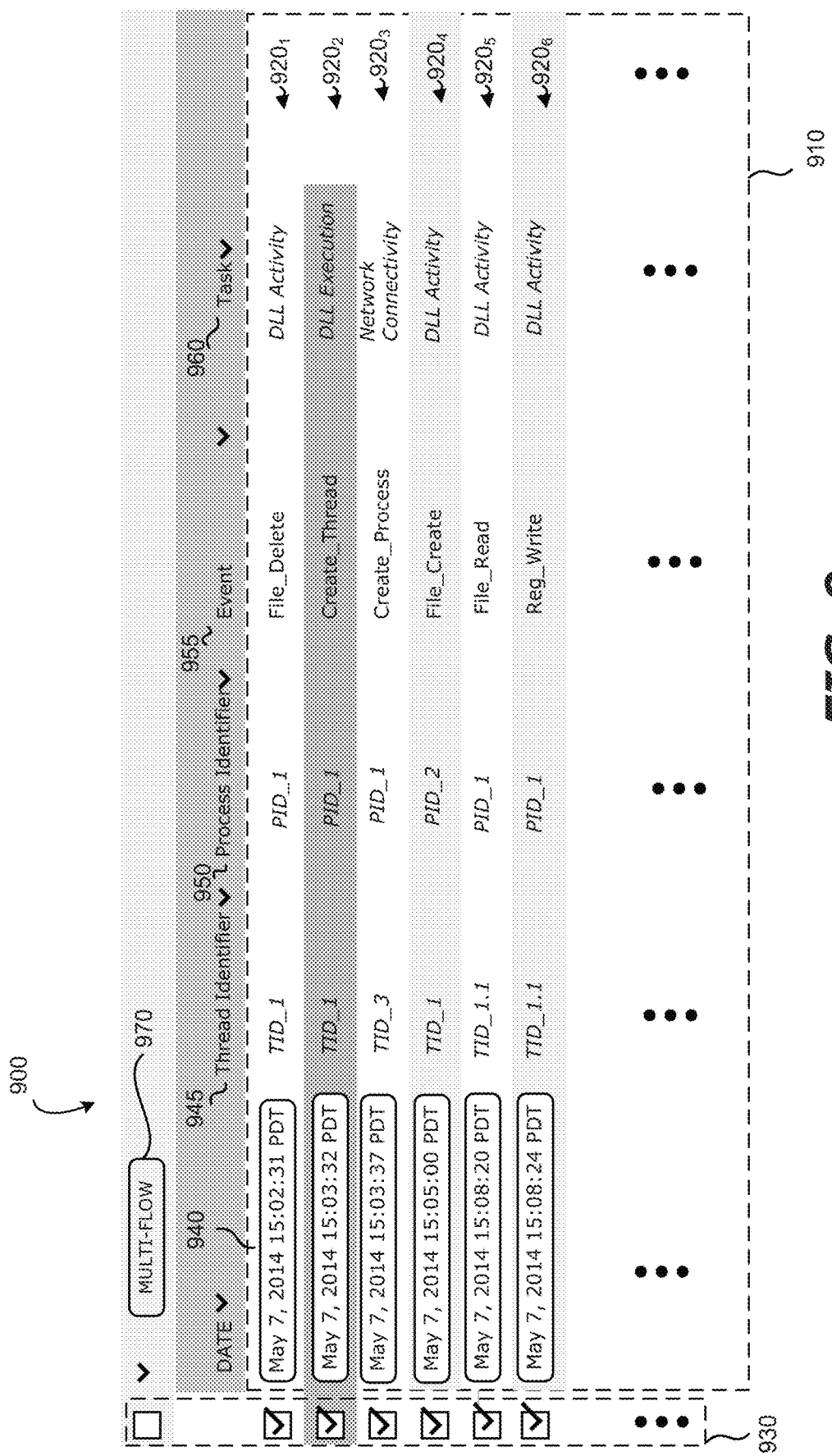
FIG. 9 is an exemplary embodiment of a malware detection screen that lists anomalous events detected during execution of a particular thread that is part of a particular process.

Referring now to FIG. 9, an exemplary embodiment of a malware detection screen that lists anomalous events detected during execution of a particular thread (identified by a thread identifier "TID") that is part of a particular process (identified by a process identifier "PID") is shown. Herein, rendered by the rendering subsystem 190, the display screen 900 features a plurality of display areas 910 and 930 that illustrate information directed to potential exploits uncovered over a selected time period.

According to one embodiment of the disclosure, a first area 910 displays a plurality of entries $920_1$-$920_R$ (R≥1, R=6 for this embodiment) that provides information directed to potential anomalous events. As shown, each row of entries (e.g., row $920_2$) rendered by logic (e.g., the rendering subsystem 190 of FIG. 1) features a plurality of fields, including one or more of the following: (1) a date of the detection 940; (2) a thread identifier 945 (e.g., TID_1) that identifies the thread that executed an object under analysis that uncovered a particular anomalous event; (3) a process identifier 950 (e.g., PID_1) that identifies the process associated with TID_1; (4) an event 955 that identifies what activity (e.g., file creation, file read, file delete, registry access, registry store, create process, terminate process, etc.) has been considered as anomalous; and/or (5) a task 960 that is a general pre-stored description that identifies the context of the event (e.g., DLL execution, Macro execution, network connectivity, etc.).

A second area 930 may be configured to allow selection of one or more of the anomalous events to request details directed to the selected anomalous event(s). These additional details may include, but are not limited or restricted to a name of the potential malware attack, potential malware family, targeted endpoint device (e.g., IP address, MAC address, device name, etc.), source of origination (e.g., MAC address, URL, etc.) or the like.

In one embodiment, when one or more anomalous events have been selected followed by selection of a button 970, a display representation of the inter-relationship between the selected PID(s) and TID(s) is shown. For example, based on the exemplary embodiment of FIG. 9 in which entries $920_1$-$920_7$ are selected, activation of the button 970 would subsequently present a display representation of the TID_1-TID_3 with PID_1; TID_1 with TID_1.1; TID_3 with PID_2; events with corresponding TIDs; and the like. Of course, without requisite selection of particular anomalous events, the button 970 may be configured to generate a display representation of the inter-relationship between all of the stored PID(s) and TID(s).

Figure 10:
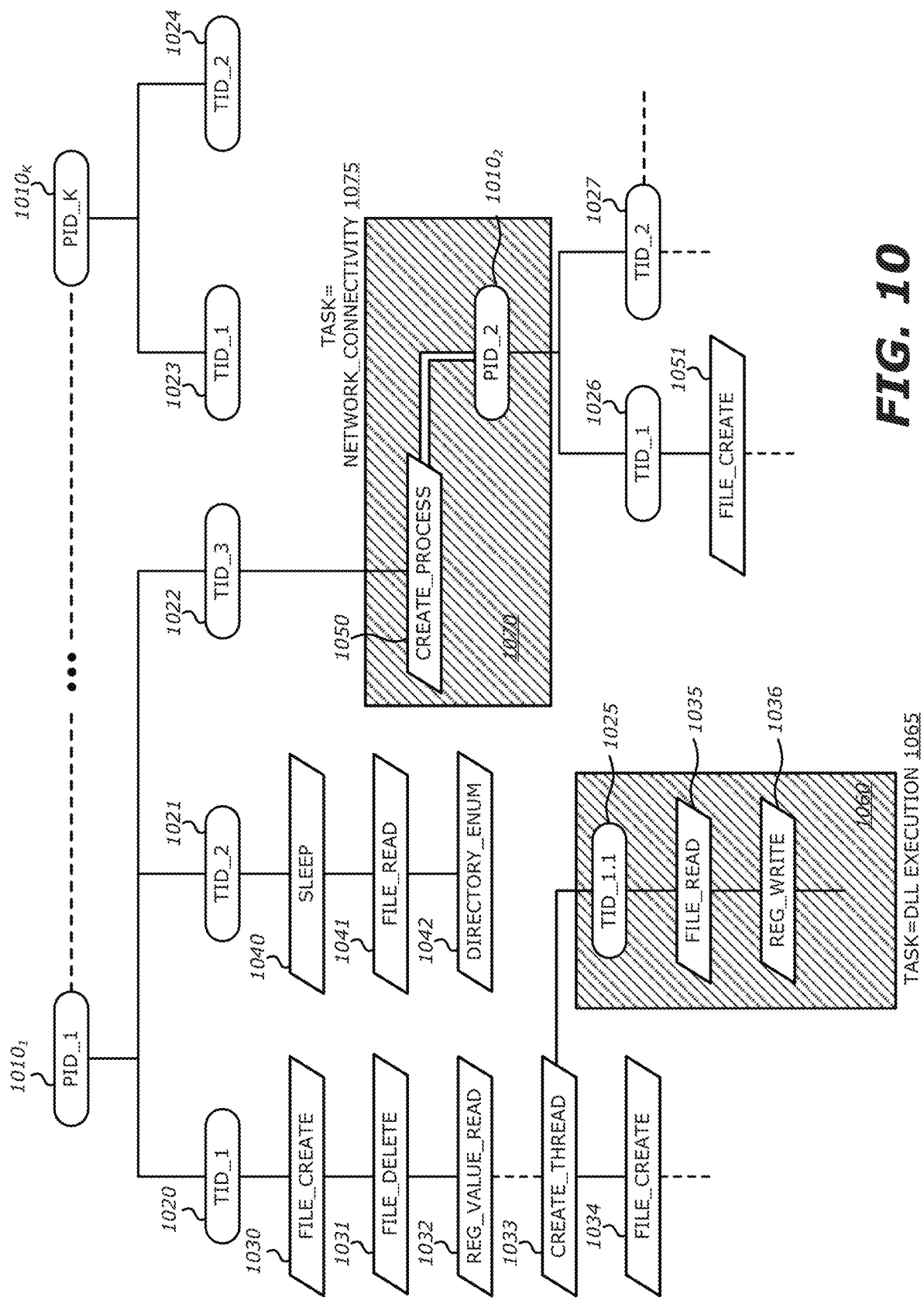
FIG. 10 is a first embodiment of a display representation of the inter-relationship between processes, threads, events and tasks in accordance with a tree-like, hierarchical topology.

As shown in FIG. 10, a first embodiment of a display representation 1000 of the inter-relationship between processes, threads, events and tasks in accordance with a tree-like, hierarchical topology is shown. Herein, the PIDs $1010_1$-$1010_K$ (K≥1) and/or TIDs 1020-1027 are illustrated with one type of geometric shape for its display elements (e.g., oblong element) while the events 1030-1036, 1040-1042 and 1050-1051 are represented with another type of geometric shape for its display element (e.g., parallelogram). The relationship between the PIDs $1010_1$-$1010_K$, TIDs 1020-1027 and events 1030-1036, 1040-1042 and 1050-1051 are displayed through connection lines there between. When heuristics identifies a created thread or an activity on a thread to be suspicious, that thread and/or activity may be highlighted as shown by highlighted regions 1060 and 1070, which are represented by a different colors or shading along with its identified task 1065 and 1075, respectively.

More specifically, as shown in FIG. 10, a first process (PID_1) $1010_1$ produces three threads, namely a first thread (TID_1) 1020, a second thread (TID_2) 1021 and a third thread (TID_3) 1022. The first thread (TID_1) 1020 commences operation in which a number of events are monitored, including file creation 1030 AND 1034, file deletion 1031, a registry value read 1032, and thread creation 1033. As shown, one of these events, namely thread creation (Create_Thread) 1033, is identified as anomalous. The anomalous events and corresponding threads may be identified in a variety of ways to highlight that the thread and its corresponding events are anomalous. Such highlighting may be accomplished through shading of a resultant anomalous thread and its corresponding events (as shown), through color differences between display elements associated with a TID and/or its corresponding anomalous events and TIDs and/or their corresponding non-anomalous events.

It is noted that the task ("DLL execution") 1065, namely the general description of the operations associated with the anomalous event, is stored to correspond to the PID_1/TID_1/Create_Thread tuple so that the task ("DLL execution") is displayed in the region 1060 proximate to its corresponding anomalous event 1033. Furthermore, subsequent events 1035 and 1036 associated with the newly created thread (TID_1.1) 1025 are identified as anomalous as well.

Referring still to FIG. 10, the second thread (TID_2) 1021 associated with the first process (PID_1) commences operation in which a number of events are monitored, including sleep 1040, file read 1041, a directory enumeration 1042. As shown, none of these events are identified as anomalous. In contrast, the third thread (TID_3) 1022 associated with the first process (PID_1) commences operation in which one or more events are monitored, including Create_Process 1050. As shown, this event is identified as anomalous. It is noted that the task ("Network Connectivity"), namely the general description of that the newly created process is associated with an unexpected attempt to establish network connectivity, is stored to correspond to the PID_2 and TID_3 so that the task ("Network Connectivity") is also displayed in a region proximate to its corresponding anomalous event.

Figure 11:
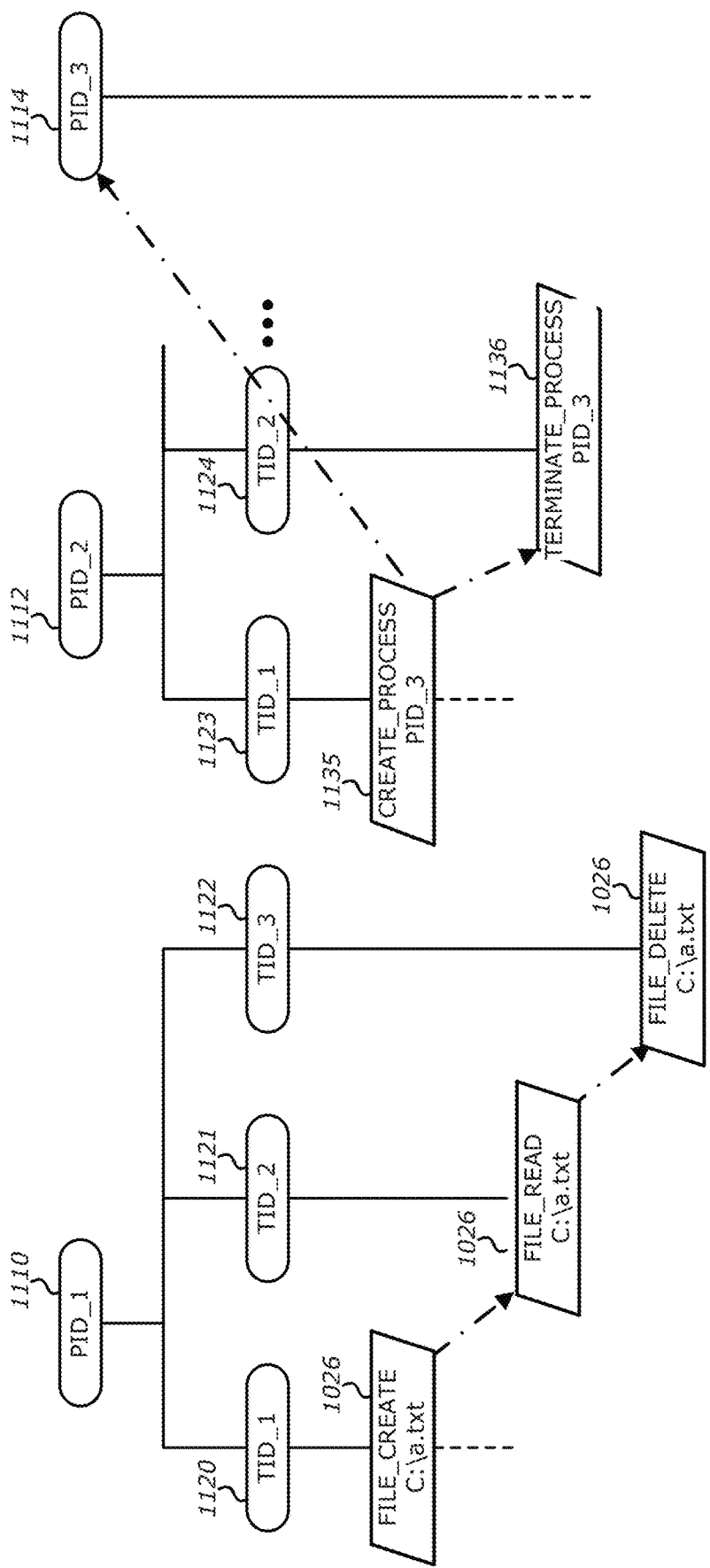
FIG. 11 is a second embodiment of a display representation of the inter-relationship between processes, threads, events and tasks that identifies the correlation among several threads and processes linked by events.

Referring now to FIG. 11, a second embodiment of a display representation that identifies the correlation among several threads and processes linked by events is shown. As in FIG. 10, a display representation 1100 features a static display of different geometric shapes and/or colors to denote differences between different display elements. For instance, the PIDs and TIDs are illustrated with one type of display element (e.g., oblong element) while events are represented with another type of display element (e.g., parallelogram). However, this correlated view may provide a granular insight as to the activities of a suspected malware.

Herein, a first process (PID_1) 1110 produces three threads, namely a first thread (TID_1) 1120, a second thread (TID_2) 1121 and a third thread (TID_3) 1122. The first thread (TID_1) 1120 commences operation in which a number of events are monitored, including file creation (File_Create) 1130. The File_Create event 1130 identifies a file name (a.txt 1140) associated with the created file and a communication path of the created file (C: drive) 1141. Different than FIG. 10, the events resulting subsequent to the File_Create event 1130, namely a File_Read event 1132 and a File_Delete event 1134 handled by different threads (TID 1121 and TID 1122), indicates a suspicious operation as the threads seem temporally coordinated for this particular file read. Such highlighting and display of the relationships between these events is accomplished by storage of the information associated with the event (e.g., the tuple including communication path and file name being part of the event information along with PID_1 and TID_1 along with storage of the PID, TID and corresponding task information.

Similarly, a first thread (TID_1) 1123 of a second process (PID_2) 1112 is illustrated where, in operation, a number of events are monitored, including process creation (Create_Process) 1135, which is identified as anomalous. The Create_Process event 1140 includes a process identifier (PID_3) 1135. Different than FIG. 10, the events resulting from the Create_Process event 1135 is associated with creation of a new process (PID_3) 1114 and execution of a second thread (TID_2) 1124 which terminates the newly created process (PID_3) 1136. The display of the relationship between these events in creating and terminating processes provides a high level view of the operations conducted by suspected (and potential) malware.

In the foregoing description, the invention is described with reference to specific exemplary embodiments thereof. It will, however, be evident that various modifications and changes may be made thereto without departing from the broader spirit and scope of the invention as set forth in the appended claims. For instance, the monitoring and storage of metadata (e.g., PID, TID, Event, task information, etc.) may be conducted by a dedicated network device other than a TDP as shown in FIGS. 7-8 above. The functionality of the dedicated network device would be consistent with the logic implemented within the TDP.

What is claimed is:

1. A computerized method comprising:
    processing one or more objects by a plurality of threads of execution, the plurality of threads of execution being part of a multi-thread process and executed by logic within a threat detection platform;
    selecting threads of the plurality of threads for monitoring;
    monitoring events of a first selected thread of the selected threads during the processing of the one or more objects, and excluding, from monitoring, events of non-selected threads of the plurality of threads, wherein the monitoring includes monitoring for events by both a first monitoring logic and a second monitoring logic that is different from the first monitoring logic, and wherein the second monitoring logic is part of a virtual execution environment;
    storing information associated with a first monitored event of the monitored events within an event log, the information comprises at least an identifier of the first selected thread to maintain an association between the first monitored events and the first selected thread; and
    accessing the stored information within the event log for rendering a graphical display of the monitored events and the first selected thread on a display screen.

2. The computerized method of claim 1, wherein the multi-thread process includes a second thread that is a thread checking for software updates.

3. The computerized method of claim 1, wherein the stored information associated with at least one monitored event detected during processing of the one or more objects by the first selected thread further comprises information directed to (a) a type of event and (b) information associated with a particular activity.

4. The computerized method of claim 3, the particular activity that occurs during the processing of the one or more objects comprises setting or accessing a registry of the threat detection platform.

5. The computerized method of claim 1 further comprising:
    processing the one or more objects by a third thread of execution being executed by the logic within the threat detection platform;
    monitoring events that occur during the processing of the one or more objects by the third thread;
    storing information associated with the monitored events that occur during the processing of the one or more objects by the third thread within the event log, the information comprises at least an identifier of the third thread.

6. The computerized method of claim 5, wherein the graphical display illustrates a relationship between the first selected thread and the third thread of the process.

7. The computerized method of claim 6, wherein the graphical display further illustrates a relationship between at least (1) the monitored events detected during processing of the one or more objects by the first selected thread of the process and (2) the monitored events detected during processing of the one or more objects by the third thread of the process.

8. The computerized method of claim 1, wherein the multi-thread process further comprises a memory allocated for an image of executable software associated with the process.

9. The computerized method of claim 1, wherein the storing of the information associated with the monitored events within the event log further comprises storing an identifier for the multi-thread process that includes the first selected thread producing the monitored events.

10. The computerized method of claim 9, wherein the storing of the information associated with the monitored events within the event log further comprises storing a generalized description of the operability of the first selected thread.

11. The computerized method of claim 1, wherein the processing of the one or more objects by the first selected thread, the monitoring of the events that occur during the processing of the one or more objects by the first selected thread, and the storing of the information associated with the monitored events within the event log enables the threat detection platform to determine whether the one or more objects that comprises a particular script is malicious.

12. The computerized method of claim 1 further comprising:
determining that the monitored events are associated with keylogging when the monitored events triggered by the first selected thread processing the one or more objects represent fake keystrokes.

13. The computerized method of claim 1, wherein the virtual execution environment is maintained by a dynamic analysis engine.

14. The computerized method of claim 13, wherein the dynamic analysis engine is deployed within cloud computing services.

15. The computerized method of claim 1, wherein each of the plurality of threads of execution perform operations on an object of the one or more objects under analysis resulting in an event of one or more detected events.

16. The computerized method of claim 1, wherein the virtual execution environment includes one or more virtual machines operably configured to perform processing of the one or more objects.

17. The computerized method of claim 1, wherein each of the one or more objects under analysis includes a collection of data having a logical structure or organization that enables classification for purposes of analysis or storage.

18. The computerized method of claim 1, wherein the first monitoring logic is configured to conduct a heuristic analysis or a rule-based analysis on the one or more detected events.

19. The computerized method of claim 1, wherein the second monitoring logic includes one or more thread monitors each configured to monitor a particular thread of the plurality of threads of execution.

20. A threat detection platform operating at least partly via cloud computing services, the threat detection platform comprising:
a communication interface;
a storage device operating at least in part as an event log;
circuitry communicatively coupled to the communication interface, the circuitry comprises logic to (i) execute a plurality of threads of execution of a multi-threaded process to process one or more objects, (ii) select one or more of the plurality of threads, (iii) monitor execution of a first selected thread of the one or more selected threads during processing of the one or more objects to detect a first set of events, and exclude from monitoring execution of non-selected threads of the plurality of threads, wherein the monitoring includes detecting one or more events, the monitoring performed by both a first monitoring logic and a second monitoring logic that is different from the first monitoring logic, and wherein the second monitoring logic is part of a virtual execution environment, and (iv) store information associated with a first detected event of the first set of events within the event log, the stored information comprises at least an identifier of the first selected thread to maintain an association between the first detected event and the first selected thread; and
a rendering subsystem in communication with the circuitry, the rendering subsystem to access the stored information within the event log for rendering a graphical display of the first detected event and the first selected thread.

21. The threat detection platform of claim 20, wherein the one or more objects is received by the circuitry via the communication interface.

22. The threat detection platform of claim 20, wherein the stored information associated with the first set of events detected during processing of the one or more objects by the first selected thread further comprises information directed to a type of object.

23. The threat detection platform of claim 20, wherein the stored information associated with the first set of events detected during processing of the one or more objects by the first selected thread further comprises information associated with a particular activity.

24. The threat detection platform of claim 20, wherein the logic to (i) process the one or more objects by a third thread of execution being part of the multi-threaded process executed by the logic of the threat detection platform, (ii) monitor execution of the third thread and detect a second set of events that occur during the processing of the one or more objects by the third thread, and (iii) store information associated with the second set of set of events within the event log, the stored information associated with the second set of events for the third thread comprises at least an identifier of the third thread.

25. The threat detection platform of claim 24, wherein the graphical display illustrates a relationship between the first selected thread and the third selected thread of the process.

26. The threat detection platform of claim 25, wherein the graphical display further illustrates a relationship between the first set of events detected during processing of the one or more objects by the first selected thread of the process and the second set of events detected during processing of the one or more objects by the third thread of the process.

27. The threat detection platform of claim 20, wherein the logic to monitor the execution of the first selected thread and detect the first set of events that occur during processing of the one or more objects by the first thread comprises a security agent, the security agent, when executed by the circuitry, is configured to (i) execute the first selected thread, (ii) monitor the execution of the first selected thread and detect the first set of events that occur during processing of the one or more objects by the first selected thread, and (iii) store the information associated with the first set of events within the event log.

28. The threat detection platform of claim 20, wherein circuitry to monitor the execution of the first selected thread and detect the first set of events that occur during processing of the one or more objects by the first selected thread comprises a virtual machine monitor, the virtual machine monitor includes logic deployed as part of a host operating system that is configured to (i) execute the first selected thread, (ii) monitor the execution of the first selected thread and detect the first set of events that occur during processing of the one or more objects by the first selected thread, and (iii) store the information associated with the first set of events within the event log.

29. The threat detection platform of claim 20, wherein circuitry to monitor the execution of the first selected thread and detect the first set of events that occur during processing of the one or more objects by the first selected thread comprises a hypervisor, the hypervisor includes logic that is deployed as an interface between a guest operating system and circuitry, the hypervisor is configured to (i) execute the first selected thread, (ii) monitor the execution of the first selected thread and detect the first set of events that occur during processing of the one or more objects by the first selected thread, and (iii) store the information associated with the first set of events within the event log.

30. The threat detection platform of claim 20, wherein the information associated with the first set of events that are stored within the event log by the logic further comprises a generalized description of the operability of the first selected thread.

31. The threat detection platform of claim 20, wherein the circuitry includes processing circuitry and the logic includes a software module that is executable by the processing circuitry.

32. The threat detection platform of claim 20, wherein the virtual execution environment is maintained by a dynamic analysis engine.

33. The threat detection platform of claim 32, wherein the dynamic analysis engine is deployed within cloud computing services.

34. The threat detection platform of claim 20, wherein each of the plurality of threads of execution perform operations on an object of the one or more objects under analysis resulting in an event of one or more detected events.

35. The threat detection platform of claim 20, wherein the virtual execution environment includes one or more virtual machines operably configured to perform processing of the one or more objects.

36. The threat detection platform of claim 20, wherein each of the one or more objects under analysis includes a collection of data having a logical structure or organization that enables classification for purposes of analysis or storage.

37. The threat detection platform of claim 20, wherein the first monitoring logic is configured to conduct a heuristic analysis or a rule-based analysis on the one or more detected events.

38. The threat detection platform of claim 20, wherein the second monitoring logic includes one or more thread monitors each configured to monitor a particular thread of the plurality of threads of execution.

39. A non-transitory computer readable medium including logic that, upon execution by circuitry within a threat detection platform, performs operations comprising:
processing one or more objects by a plurality of threads of execution, the plurality of threads of execution being part of a multi-threaded process and executed by logic of the threat detection platform;
selecting one or more threads of the plurality of threads;
monitoring execution of a first selected thread of the one or more selected threads during the processing of the one or more objects to detect a first set of events while excluding from monitoring execution of non-selected threads of the plurality of threads, wherein the monitoring includes detecting one or more events, the monitoring performed by both a first monitoring logic and a second monitoring logic that is different from the first monitoring logic, and wherein the second monitoring logic is part of a virtual execution environment;
storing information associated with a first detected event of the first set of events within an event log, the information comprises at least an identifier of the first selected thread to maintain an association between the first detected event and the first selected thread; and
accessing the stored information within the event log for rendering a graphical display of the first detected event and the first selected thread on a display screen.

40. The non-transitory computer readable medium of claim 39, wherein the logic that, upon execution by the circuitry within the threat detection platform, is configured to monitor and report through graphical display script execution.

41. The non-transitory computer readable medium of claim 39, wherein the logic that, upon execution by the circuitry within the threat detection platform, is configured to allow for exclusively tracking of activities of injected code executed by the first selected thread without monitoring of other events associated with the multi-threaded process.

42. The non-transitory computer readable medium of claim 39, wherein the logic that, upon execution by the circuitry within the threat detection platform, is configured to enable monitoring of execution of the first selected thread and disable monitoring of execution of a second thread of the multi-threaded process, the second thread configured to detect types of functions or events different than the prescribed types of functions or events.

43. The non-transitory computer readable medium of claim 39, wherein the logic that, upon execution by the circuitry within the threat detection platform, is configured to add or remove thread selection criteria to concentrate the monitoring to detect the prescribed types of functions or events associated with the first selected thread.

44. The non-transitory computer readable medium of claim 39, wherein the virtual execution environment is maintained by a dynamic analysis engine.

45. The non-transitory computer readable medium of claim 44, wherein the dynamic analysis engine is deployed within cloud computing services.

46. The non-transitory computer readable medium of claim 39, wherein each of the plurality of threads of execution perform operations on an object of the one or more objects under analysis resulting in an event of one or more detected events.

47. The non-transitory computer readable medium of claim 39, wherein the virtual execution environment includes one or more virtual machines operably configured to perform processing of the one or more objects.

48. The non-transitory computer readable medium of claim 39, wherein each of the one or more objects under analysis includes a collection of data having a logical structure or organization that enables classification for purposes of analysis or storage.

49. The non-transitory computer readable medium of claim 39, wherein the first monitoring logic is configured to conduct a heuristic analysis or a rule-based analysis on the one or more detected events.

50. The non-transitory computer readable medium of claim 39, wherein the second monitoring logic includes one or more thread monitors each configured to monitor a particular thread of the plurality of threads of execution.

* * * * *